(12) United States Patent
Thissen et al.

(10) Patent No.: US 12,544,096 B2
(45) Date of Patent: Feb. 10, 2026

(54) STEERABLE INSTRUMENT COMPRISING A HINGE WITH A SLOTTED STRUCTURE

(71) Applicant: Fortimedix Assets II B.V., Geleen (NL)

(72) Inventors: Mattheus Hendrik Louis Thissen, Swalmen (NL); Marcel Antonius Elisabeth Verbeek, Voerendaal (NL)

(73) Assignee: Fortimedix Assets II B.V., Geleen (NL)

( * ) Notice: Subject to any disclaimer, the term of this patent is extended or adjusted under 35 U.S.C. 154(b) by 1065 days.

(21) Appl. No.: 17/598,943

(22) PCT Filed: Apr. 1, 2020

(86) PCT No.: PCT/NL2020/050221
§ 371 (c)(1),
(2) Date: Sep. 28, 2021

(87) PCT Pub. No.: WO2020/214027
PCT Pub. Date: Oct. 22, 2020

(65) Prior Publication Data
US 2022/0168008 A1    Jun. 2, 2022

(30) Foreign Application Priority Data

Apr. 1, 2019  (NL) ..................................... 2022848
Apr. 1, 2019  (NL) ..................................... 2022849

(51) Int. Cl.
*A61B 17/3201* (2006.01)
*A61B 17/00* (2006.01)
*A61B 17/32* (2006.01)

(52) U.S. Cl.
CPC .... *A61B 17/3201* (2013.01); *A61B 17/32002* (2013.01); *A61B 2017/00309* (2013.01);
(Continued)

(58) Field of Classification Search
USPC .......................................................... 606/1
See application file for complete search history.

(56) References Cited

U.S. PATENT DOCUMENTS

| 2,515,366 A | 7/1950 | Zublin |
| 2,717,146 A | 9/1955 | Zublin |

(Continued)

FOREIGN PATENT DOCUMENTS

| CH | 81017 A | 5/1919 |
| CN | 101522121 B | 9/2011 |

(Continued)

*Primary Examiner* — Michael T. Holtzclaw
(74) *Attorney, Agent, or Firm* — Fortem IP LLP

(57) ABSTRACT

A cylindrical element with a hinge structure has:
  a first portion (524; 1124; 522(*n*–1); 1122(*n*–1));
  a second portion (522(1); 1122(1); 522(*n*); 1122(*n*)) which is rotatable relative to the first portion (524; 1124; 522(*n*–1); 1122(*n*–1)) about two rotation sections (530(1); 1130(1); 530(*n*); 1130(*n*)) arranged at locations 180° rotated relative to one another viewed in a tangential direction of the cylindrical element;
  an attachment element (502(1); 1006; 502(*n*)).
The rotation sections (530(1); 1130(1); 530(*n*); 1130(*n*)) are implemented by:
  either the first portion (524; 1124; 522(*n*–1); 1122(*n*–1)) or the second portion (522(1); 1122(1); 522(*n*); 1122 (*n*)) is provided with an opening accommodating a pin (556(1); 1156(1); 556(*n*); 1156(*n*));
  the pin (556(1); 1156(1); 556(*n*); 1156(*n*)) is attached to a portion of the attachment element (502(1); 1006; 502 (*n*));
  the other one of the first portion (524; 1124; 522(*n*–1); 1122(*n*–1)) and the second portion (522(1); 1122(1); 522(*n*); 1122(*n*)) is attached to another portion of the attachment element (502(1); 1006; 502(*n*));
  such that the first portion (524; 1124; 522(*n*–1); 1122(*n*–1)) and the second portion (522(1); 1122(1); 522(*n*); 1122(*n*)) cannot move relative to one another in a longitudinal direction, a tangential direction and a
(Continued)

radial direction but are configured to rotate relative to one another about a center of rotation.

17 Claims, 14 Drawing Sheets

(52) U.S. Cl.
CPC .............. *A61B 2017/00314* (2013.01); *A61B 2017/00323* (2013.01); *A61B 2017/00526* (2013.01)

(56) References Cited

U.S. PATENT DOCUMENTS

| | | | |
|---|---|---|---|
| 3,788,304 | A | 1/1974 | Takahasi |
| 4,362,520 | A | 12/1982 | Perry |
| 4,706,659 | A | 11/1987 | Matthews et al. |
| 4,745,908 | A | 5/1988 | Wardle |
| 5,271,381 | A | 12/1993 | Ailinger et al. |
| 5,749,828 | A | 5/1998 | Solomon et al. |
| 5,807,241 | A | 9/1998 | Heimberger |
| 5,928,136 | A | 7/1999 | Storz |
| 6,019,780 | A * | 2/2000 | Lombardo .......... A61B 17/1608 606/174 |
| 6,107,004 | A | 8/2000 | Donadio, III |
| 6,408,889 | B1 * | 6/2002 | Komachi .............. A61B 1/0055 138/155 |
| 6,450,948 | B1 | 9/2002 | Matsuura et al. |
| 6,890,329 | B2 | 5/2005 | Carroll et al. |
| 7,189,228 | B2 | 3/2007 | Eum et al. |
| 7,320,700 | B2 | 1/2008 | Cooper et al. |
| 7,553,275 | B2 | 6/2009 | Padget et al. |
| 7,615,067 | B2 | 11/2009 | Lee et al. |
| 8,257,267 | B2 | 9/2012 | Thornton |
| 8,323,241 | B2 | 12/2012 | Salahieh et al. |
| 8,327,518 | B2 | 12/2012 | Korner |
| 8,382,742 | B2 | 2/2013 | Hermann et al. |
| 8,398,587 | B2 | 3/2013 | Dewaele et al. |
| 8,708,954 | B2 | 4/2014 | Webler |
| 8,740,884 | B2 | 6/2014 | Verbeek |
| 8,845,522 | B2 | 9/2014 | Mcintyre et al. |
| 8,882,680 | B2 | 11/2014 | Furlong et al. |
| 8,986,317 | B2 | 3/2015 | Verbeek |
| 9,072,505 | B2 | 7/2015 | Furlong et al. |
| 9,138,566 | B2 | 9/2015 | Cabiri |
| 9,198,561 | B2 | 12/2015 | Smith et al. |
| 9,220,398 | B2 | 12/2015 | Woodley et al. |
| 9,339,271 | B2 | 5/2016 | Ranucci et al. |
| 9,421,343 | B2 | 8/2016 | Berthiaume et al. |
| 9,462,932 | B2 | 10/2016 | Ostrovsky et al. |
| 9,468,359 | B2 | 10/2016 | Weisshaupt et al. |
| 9,655,637 | B2 | 5/2017 | Mueller |
| 9,848,858 | B2 | 12/2017 | Verbeek |
| 9,877,720 | B2 | 1/2018 | Worrell et al. |
| 10,010,246 | B2 | 7/2018 | Quaye |
| 10,022,877 | B2 | 7/2018 | Wang |
| 10,265,087 | B2 | 4/2019 | Furlong et al. |
| 10,405,876 | B2 | 9/2019 | Boudreaux |
| 10,420,537 | B2 | 9/2019 | Salahieh et al. |
| 10,441,746 | B2 | 10/2019 | Besselink |
| 10,449,010 | B2 | 10/2019 | Dewaele et al. |
| 10,456,556 | B2 | 10/2019 | Cabiri |
| 10,485,579 | B2 | 11/2019 | Lenker |
| 10,492,771 | B2 | 12/2019 | Nunan |
| 10,500,373 | B2 | 12/2019 | Barrish et al. |
| 10,512,392 | B2 | 12/2019 | Gurusamy et al. |
| 10,524,868 | B2 | 1/2020 | Cooper et al. |
| 10,542,878 | B2 | 1/2020 | Dewaele et al. |
| 10,561,467 | B2 | 2/2020 | Van Der Linde et al. |
| 10,603,047 | B2 | 3/2020 | Ding et al. |
| 10,646,104 | B1 | 5/2020 | Sinay et al. |
| 10,729,457 | B2 | 8/2020 | Lenker et al. |
| 10,792,061 | B2 | 10/2020 | Dewaele et al. |
| 10,799,223 | B2 | 10/2020 | Furlong et al. |
| 10,874,290 | B2 | 12/2020 | Walen et al. |
| 10,962,093 | B2 | 3/2021 | Dewaele et al. |
| 11,007,026 | B2 | 5/2021 | Kowshik |
| 11,033,255 | B2 | 6/2021 | Furlong et al. |
| 11,051,794 | B2 | 7/2021 | Cooper et al. |
| 11,052,226 | B2 | 7/2021 | Salahieh et al. |
| 11,103,234 | B2 | 8/2021 | Felix et al. |
| 11,130,244 | B2 | 9/2021 | Jogasaki |
| 11,134,928 | B2 | 10/2021 | Felix et al. |
| 11,141,566 | B2 | 10/2021 | Cabiri |
| 11,241,557 | B2 | 2/2022 | Besselink |
| 11,278,704 | B2 | 3/2022 | Pleijers |
| 11,330,964 | B2 | 5/2022 | Thissen |
| 11,350,914 | B2 | 6/2022 | Furlong et al. |
| 11,382,654 | B2 | 7/2022 | Lenker |
| 11,419,691 | B2 | 8/2022 | Kim et al. |
| 11,457,904 | B2 | 10/2022 | Dewaele et al. |
| 11,523,807 | B2 | 12/2022 | Furlong et al. |
| 11,564,670 | B2 | 1/2023 | Furlong et al. |
| 11,576,735 | B2 | 2/2023 | Blanckaert et al. |
| 11,589,733 | B2 | 2/2023 | Sinay et al. |
| 11,607,242 | B2 | 3/2023 | Tada et al. |
| 11,642,114 | B2 | 5/2023 | Thissen |
| 11,660,101 | B2 | 5/2023 | Walen et al. |
| 11,696,677 | B2 | 7/2023 | Thissen |
| 11,730,921 | B2 | 8/2023 | Besselink |
| 11,730,927 | B2 | 8/2023 | Laby et al. |
| 11,839,401 | B2 | 12/2023 | Lenker |
| 12,048,819 | B2 | 7/2024 | Yang et al. |
| 12,295,550 | B2 | 5/2025 | Tilson et al. |
| 2004/0199052 | A1 | 10/2004 | Banik et al. |
| 2004/0236316 | A1 | 11/2004 | Danitz et al. |
| 2005/0027245 | A1 | 2/2005 | Sachdeva et al. |
| 2005/0272978 | A1 * | 12/2005 | Brunnen ................ A61B 1/008 600/142 |
| 2005/0273084 | A1 | 12/2005 | Hinman et al. |
| 2005/0273085 | A1 | 12/2005 | Hinman et al. |
| 2006/0199999 | A1 | 9/2006 | Ikeda et al. |
| 2006/0281566 | A1 | 12/2006 | Lee |
| 2007/0049800 | A1 | 3/2007 | Boulais |
| 2007/0250113 | A1 | 10/2007 | Hegeman et al. |
| 2007/0282371 | A1 | 12/2007 | Lee et al. |
| 2007/0287993 | A1 | 12/2007 | Hinman et al. |
| 2008/0249364 | A1 | 10/2008 | KÖrner |
| 2008/0300462 | A1 | 12/2008 | Intoccia et al. |
| 2009/0069632 | A1 | 3/2009 | McIntyre et al. |
| 2009/0124857 | A1 | 5/2009 | Viola |
| 2010/0151161 | A1 | 6/2010 | Da |
| 2010/0228191 | A1 | 9/2010 | Alvarez et al. |
| 2010/0234831 | A1 | 9/2010 | Hinman et al. |
| 2010/0286480 | A1 | 11/2010 | Peine et al. |
| 2010/0287755 | A1 | 11/2010 | KÖrner |
| 2011/0004157 | A1 | 1/2011 | Dewaele et al. |
| 2011/0295065 | A1 | 12/2011 | Gurusamy et al. |
| 2012/0116163 | A1 | 5/2012 | Lutze et al. |
| 2012/0245414 | A1 | 9/2012 | Verbeek |
| 2012/0277730 | A1 | 11/2012 | Salahieh et al. |
| 2012/0323077 | A1 | 12/2012 | Verbeek |
| 2013/0184528 | A1 | 7/2013 | Onuki et al. |
| 2013/0197490 | A1 | 8/2013 | Stanton et al. |
| 2013/0253469 | A1 | 9/2013 | Freed |
| 2014/0018620 | A1 | 1/2014 | Verbeek |
| 2014/0249474 | A1 | 9/2014 | Suon et al. |
| 2015/0099997 | A1 | 4/2015 | Cabiri |
| 2015/0107396 | A1 | 4/2015 | Suehara |
| 2015/0112134 | A1 | 4/2015 | Suehara et al. |
| 2015/0157353 | A1 | 6/2015 | Lenker et al. |
| 2015/0352728 | A1 | 12/2015 | Wang |
| 2015/0366445 | A1 | 12/2015 | Rutgers |
| 2016/0015249 | A1 | 1/2016 | Suehara |
| 2016/0089208 | A1 * | 3/2016 | Vetter ................ A61B 17/3201 606/130 |
| 2016/0096004 | A1 | 4/2016 | Gerrans et al. |
| 2016/0136393 | A1 | 5/2016 | Tsai et al. |
| 2016/0278616 | A1 | 9/2016 | Viebach et al. |
| 2017/0027607 | A1 | 2/2017 | Verbeek et al. |
| 2018/0049873 | A1 | 2/2018 | Manash et al. |
| 2018/0055589 | A1 | 3/2018 | Joseph et al. |
| 2018/0289241 | A1 | 10/2018 | Zhou et al. |

(56) References Cited

U.S. PATENT DOCUMENTS

| | | | |
|---|---|---|---|
| 2019/0111237 A1 | 4/2019 | Cabiri | |
| 2019/0111238 A1 | 4/2019 | Schultz et al. | |
| 2019/0175869 A1 | 6/2019 | Kirt et al. | |
| 2020/0107898 A1* | 4/2020 | Kim | A61B 34/74 |
| 2020/0205908 A1* | 7/2020 | Julian | A61B 1/0055 |
| 2020/0275983 A1 | 9/2020 | Dewaele et al. | |
| 2020/0330729 A1 | 10/2020 | Petitpierre et al. | |
| 2021/0267702 A1 | 9/2021 | Kim et al. | |
| 2021/0275266 A1 | 9/2021 | Kim et al. | |
| 2021/0378648 A1 | 12/2021 | Thissen et al. | |
| 2022/0061634 A1 | 3/2022 | Thissen et al. | |
| 2022/0087666 A1 | 3/2022 | Sharma et al. | |
| 2022/0117576 A1 | 4/2022 | Mixter et al. | |
| 2022/0167836 A1 | 6/2022 | Thissen et al. | |
| 2022/0331003 A1 | 10/2022 | Cohen et al. | |
| 2023/0031313 A1 | 2/2023 | Lynn et al. | |
| 2023/0131647 A1 | 4/2023 | Magno et al. | |
| 2023/0165573 A1 | 6/2023 | Furlong et al. | |
| 2023/0190329 A1 | 6/2023 | Tada et al. | |
| 2023/0255644 A1 | 8/2023 | Walen et al. | |
| 2024/0138946 A1 | 5/2024 | Swoyer et al. | |
| 2024/0173130 A1 | 5/2024 | Mcniven et al. | |
| 2024/0216008 A1 | 7/2024 | Lenker | |
| 2024/0245284 A1 | 7/2024 | Thissen | |
| 2024/0306900 A1 | 9/2024 | Thissen et al. | |
| 2024/0389835 A1 | 11/2024 | Thissen et al. | |
| 2025/0049305 A1 | 2/2025 | Thissen | |
| 2025/0049307 A1 | 2/2025 | Thissen | |

FOREIGN PATENT DOCUMENTS

| | | | |
|---|---|---|---|
| DE | 3219629 A1 | 12/1983 | |
| DE | 4222121 C1 | 9/1993 | |
| DE | 102009037030 A1 | 2/2011 | |
| DE | 102010000787 A1 | 7/2011 | |
| DE | 102010005243 A1 | 7/2011 | |
| EP | 0439931 A1 * | 8/1991 | A61B 1/008 |
| EP | 0626604 A2 | 11/1994 | |
| EP | 0764423 A1 | 7/1996 | |
| EP | 1977677 A1 | 10/2008 | |
| JP | 2008188095 | 8/2008 | |
| JP | 2010124868 A * | 6/2010 | A61B 1/00071 |
| JP | 2012075659 | 4/2012 | |
| JP | 2015213758 A | 12/2015 | |
| KR | 101312071 B1 | 9/2013 | |
| NL | 2030160 B1 | 6/2023 | |
| WO | 97/42910 A1 | 11/1997 | |
| WO | 03/037416 A1 | 5/2003 | |
| WO | 2004/052171 A2 | 6/2004 | |
| WO | WO2004103430 A2 | 12/2004 | |
| WO | 2006/026520 A2 | 3/2006 | |
| WO | WO2008139768 A1 | 3/2008 | |
| WO | 2009/098244 A2 | 8/2009 | |
| WO | 2009/112060 A1 | 9/2009 | |
| WO | 2009/127236 A1 | 10/2009 | |
| WO | 2010/028090 A2 | 3/2010 | |
| WO | 2010/105649 A1 | 9/2010 | |
| WO | 2010/136272 A1 | 12/2010 | |
| WO | 2010/136274 A1 | 12/2010 | |
| WO | 2010/151698 A2 | 12/2010 | |
| WO | 2011/018179 A2 | 2/2011 | |
| WO | 2011018147 | 2/2011 | |
| WO | 2011/079897 A1 | 7/2011 | |
| WO | 2012/035531 A1 | 3/2012 | |
| WO | 2012/128618 A1 | 9/2012 | |
| WO | 2012/139869 A2 | 10/2012 | |
| WO | 2012/151396 A2 | 11/2012 | |
| WO | 2012/173478 A1 | 12/2012 | |
| WO | 2013/084985 A1 | 6/2013 | |
| WO | 2013173197 A1 | 11/2013 | |
| WO | 2014/011049 A1 | 1/2014 | |
| WO | 2014186736 A1 | 11/2014 | |
| WO | 2015051070 A1 | 4/2015 | |
| WO | 2015/085307 A1 | 6/2015 | |
| WO | 2015084174 A1 | 6/2015 | |
| WO | 2016/030457 A1 | 3/2016 | |
| WO | 2016/061291 A1 | 4/2016 | |
| WO | 2016054063 A1 | 4/2016 | |
| WO | 2016/089202 A1 | 6/2016 | |
| WO | 2016/091856 A1 | 6/2016 | |
| WO | 2016/091858 A1 | 6/2016 | |
| WO | 2016/138443 A2 | 9/2016 | |
| WO | 2016/160694 A1 | 10/2016 | |
| WO | 2016/172706 A1 | 10/2016 | |
| WO | 2017/010883 A2 | 1/2017 | |
| WO | 2017/014624 A1 | 1/2017 | |
| WO | 2017/082720 A1 | 5/2017 | |
| WO | 2017/176766 A1 | 10/2017 | |
| WO | 2017/213491 A1 | 12/2017 | |
| WO | 2018/067004 A1 | 4/2018 | |
| WO | 2018083674 A2 | 5/2018 | |
| WO | 2019/009710 A1 | 1/2019 | |
| WO | 2019077461 A1 | 4/2019 | |
| WO | WO-2019077402 A2 * | 4/2019 | A61B 1/00071 |
| WO | 2019/096932 A1 | 5/2019 | |
| WO | 2019/139811 A1 | 7/2019 | |
| WO | 2019159142 A1 | 8/2019 | |
| WO | 2020/080938 A2 | 4/2020 | |
| WO | 2020/102389 A1 | 5/2020 | |
| WO | 2020/214027 A2 | 10/2020 | |
| WO | 2020/218920 A2 | 10/2020 | |
| WO | 2020/218921 A2 | 10/2020 | |
| WO | 2021/146677 A1 | 7/2021 | |
| WO | 2024033706 A1 | 2/2024 | |
| WO | 2025026670 A1 | 2/2025 | |
| WO | 2025026702 A1 | 2/2025 | |

\* cited by examiner

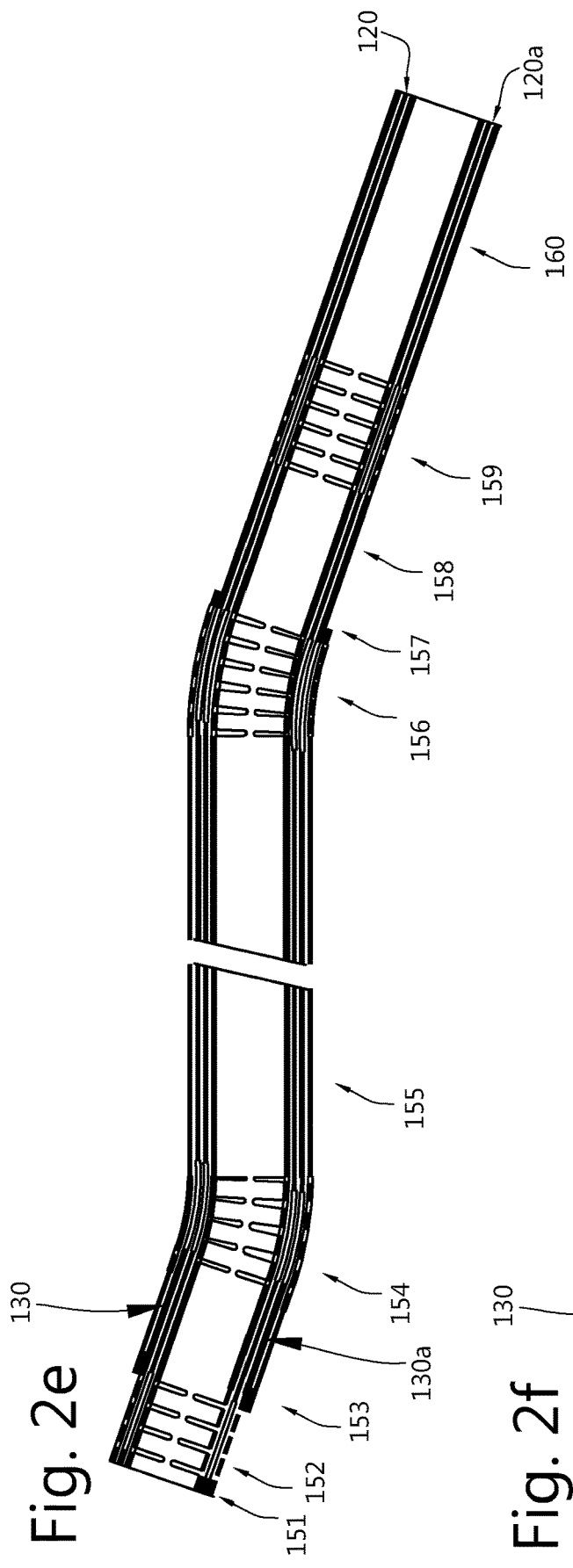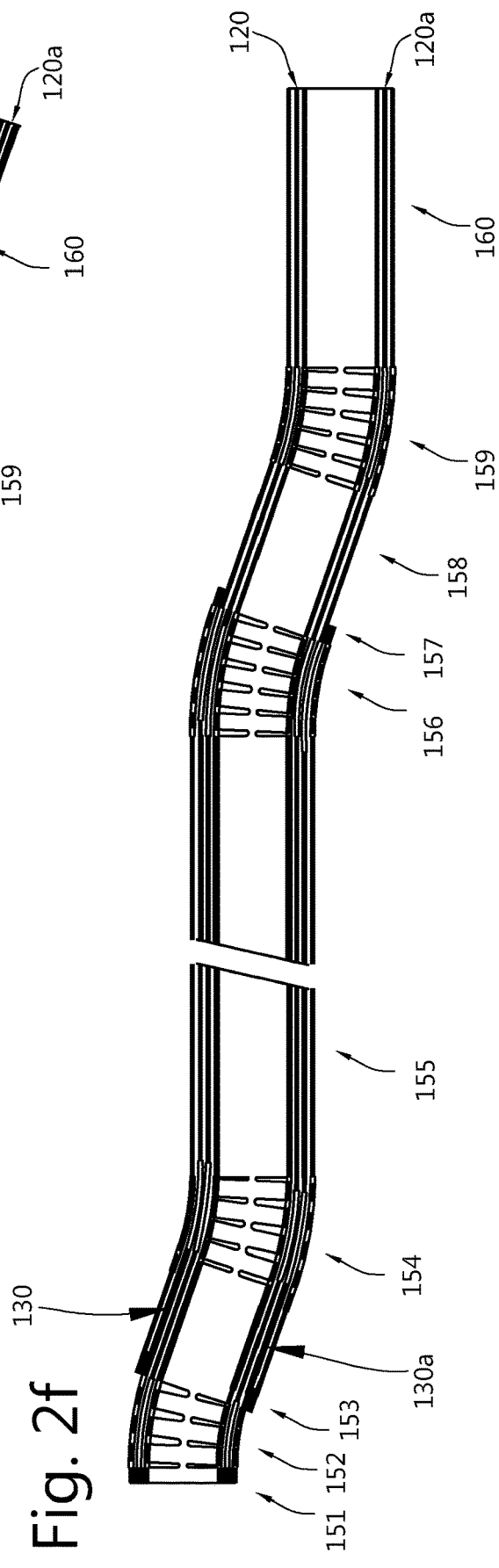

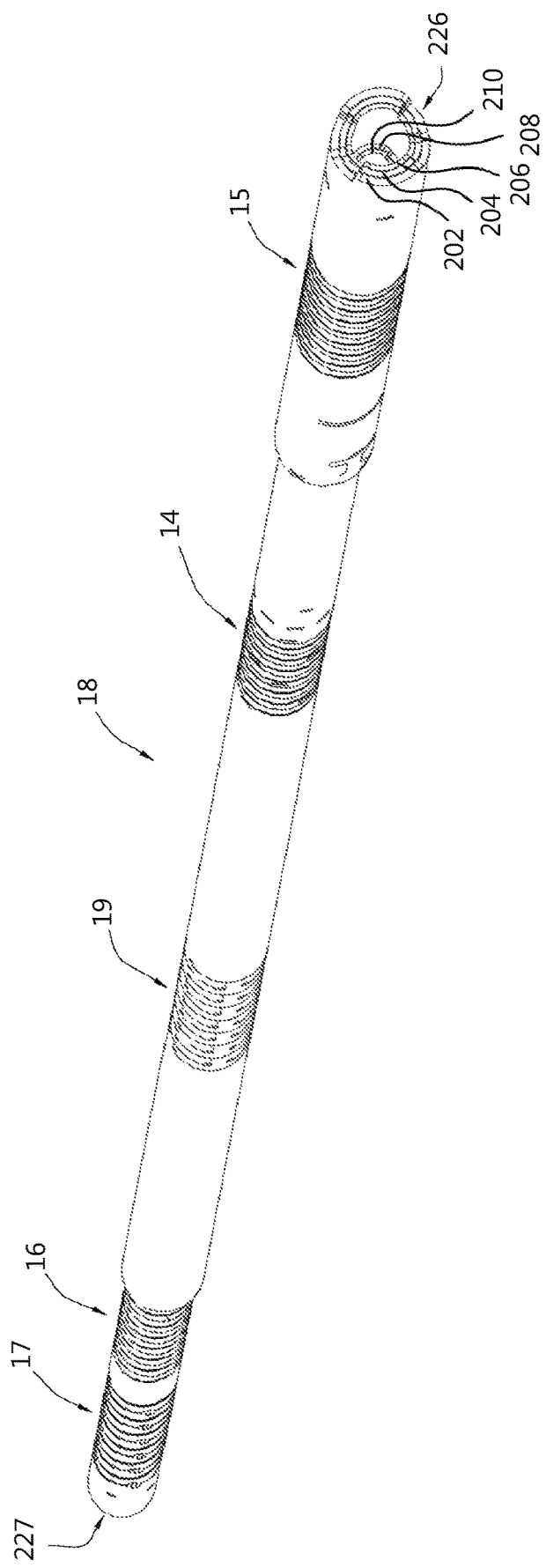

STEERABLE INSTRUMENT COMPRISING A HINGE WITH A SLOTTED STRUCTURE

FIELD OF THE INVENTION

The present invention relates to a steerable instrument for endoscopic and/or invasive type of applications, such as in surgery. The steerable instrument according to the invention can be used in both medical and non-medical applications. Examples of the latter include inspection and/or repair of mechanical and/or electronic hardware at locations that are difficult to reach. Hence, terms used in the following description such as endoscopic application or invasive instrument, must be interpreted in a broad manner.

BACKGROUND ART

Transformation of surgical interventions that require large incisions for exposing a target area into minimal invasive surgical interventions, i.e. requiring only natural orifices or small incisions for establishing access to the target area, is a well-known and ongoing process. In performing minimal invasive surgical interventions, an operator such as a physician, requires an access device that is arranged for introducing and guiding invasive instruments into the human or animal body via an access port of that body. In order to reduce scar tissue formation and pain to a human or animal patient, the access port is preferably provided by a single small incision in the skin and underlying tissue. In that respect the possibility to use a natural orifice of the body would even be better. Furthermore, the access device preferably enables the operator to control one or more degrees of freedom that the invasive instruments offer. In this way, the operator can perform required actions at the target area in the human or animal body in an ergonomic and accurate manner with a reduced risk of clashing of the instruments used.

Surgical invasive instruments and endoscopes through which these instruments are guided towards the target area are well-known in the art. Both the invasive instruments and endoscopes can comprise a steerable tube that enhances its navigation and steering capabilities. Such a steerable tube preferably comprises a proximal end part including at least one flexible zone, a distal end part including at least one flexible zone, and a rigid or flexible intermediate part, wherein the steerable tube further comprises a steering arrangement that is adapted for translating a deflection of at least a part of the proximal end part relative to the rigid intermediate part into a related deflection of at least a part of the distal end part.

Furthermore, the steerable tube preferably comprises a number of co-axially arranged cylindrical elements including an outer element, an inner element and one or more intermediate elements depending on the number of flexible zones in the proximal and distal end parts of the tube and the desired implementation of the steering members of the steering arrangement, i.e. all steering members can be arranged in a single intermediate element or the steering members are divided in different sets and each set of steering members is arranged in a different intermediate member. Moreover, steering members can be divided in sub-portions arranged in different intermediate members. In most prior art devices, the steering arrangement comprises conventional steering cables with, for instance, sub 1 mm diameters as steering members, wherein the steering cables are arranged between related flexible zones at the proximal and distal end parts of the tube. However, steering cables may have disadvantages for certain applications. So, it is sometimes preferred to avoid them and to implement the steering members by one or more sets of longitudinal elements that form integral parts of the one or more intermediate elements. Each of the intermediate elements can be fabricated either by using a suitable material addition technique, such as injection moulding or plating, or by starting from a cylindrical element and then using a suitable material removal technique, such as laser cutting, photochemical etching, deep pressing, conventional chipping techniques such as drilling or milling or high-pressure water jet cutting systems. Of the aforementioned material removal techniques, laser cutting is very advantageous as it allows a very accurate and clean removal of material under reasonable economic conditions. Further details regarding the design and fabrication of the abovementioned steerable tube and the steering arrangement thereof have been described for example in WO 2009/112060 A1, WO 2009/127236 A1, U.S. Ser. No. 13/160,949, and U.S. Ser. No. 13/548,935 of the applicant, all of which are hereby incorporated by reference in their entirety. The hinge of the present invention is applicable in all the arrangements described in these patent documents. Further, the hinge of the present invention is equally applicable in instruments with "classic" cables or wires.

Steerable invasive instruments typically comprise a handle that is arranged at the proximal end part of the steerable tube for steering the tube and/or for manipulating a tool that is arranged at the distal end part of the steerable tube. Such a tool can for example be a camera, a manual manipulator, e.g. a pair of scissors, forceps, or manipulators using an energy source, e.g. an electrical, ultrasonic or optical energy source. The instrument may be a catheter.

In this application, the terms "proximal" and "distal" are defined with respect to an operator, e.g. a physician that operates the instrument or endoscope. For example, a proximal end part is to be construed as a part that is located near the physician and a distal end part as a part located at a distance from the physician.

In these steerable instruments, the longitudinal elements (or steering wires or cables) need be flexible in at least those portions of the instrument that should allow bending relative to the longitudinal axis of the instrument, both at the proximal end and distal end. These longitudinal elements are often located between an adjacent outer and adjacent inner cylindrical element. When bending these flexible zones of the instrument, in each such zone these longitudinal elements bend together with bendable portions of the outer and inner cylindrical element.

Bendable zones in cylindrical elements may be implemented by means of hinges manufactured as a slotted structure in the cylindrical element. Such slots may be made by laser cutting or water cutting through the cylindrical element. There is a continuous desire to optimize such hinges as to flexibility (i.e., bendable capacity), resistance against elasticity in the longitudinal direction of the cylindrical element (longitudinal stiffness), and resistance against elasticity in the tangential direction of the cylindrical element (tangential stiffness). There is a special need for hinges that provides the cylindrical element with a bending capacity of more than 90° along an as short as possible longitudinal portion of the cylindrical element without the hinge getting outside its elastic range. More specific back ground as to hinges is as follows.

In steerable instruments as described in WO2009/112060 and WO2009/127236, the flexible sections in the inner and outer layers need some kind of hinges and/or elastic structures to provide for bendability of these sections. Preferably, bending of these sections requires minimal force and has minimal friction but the flexible sections should have sufficient longitudinal and torsion (rotational) strength to provide for robust handling and manipulation performance. Another requirement is that after manufacturing the required geometries and features in these layers, the processed tube should still be in one piece and straight for further handling, alignment and instrument assembly steps.

Hinges can be formed by small elements of material that can bend easily by elastic deformation and that keep the processed tube in one piece and straight as is shown in for example WO2009/112060, WO2009/127236 and WO2018/067004. Disadvantage of these types of hinges is that the bendability is limited because one wants to keep deformation of the hinge element elastically instead of plastically. Plastic deformations would result in a very short fatigue life of the hinges and structural integrity of the instrument can then only be maintained for a small number of deflections of the bendable zones. Another disadvantage is that elastically bending the material of the hinges requires a relatively high force which requires the use of strong pulling wires to prevent deflection losses due to elastic stretching of the pulling wires.

Hinges can also be formed by cutting real hinges in which a circularly shaped hinge element can rotate freely in a corresponding recess. To prevent that the tube after processing falls apart, the shape of this hinge has to be such that the circular element is enclosed more than 180 degrees by the corresponding recess, which provides for longitudinal integrity. But the hinges can still separate by sliding along the hinge axis itself (perpendicular to the longitudinal axis of the tube) and so the processed tube can still fall apart in separate parts. Also, after processing, a tube with these hinges will not stay straight after processing, is very floppy and will bend easily. This makes further handling, alignment and instrument assembly difficult. These hinges are, for example, explained in non-pre-published Dutch patent application NL2021823 FIG. 5A. To prevent floppiness of the tube and separation of parts along the hinge axis after processing, one could incorporate very small and easily bendable elastic bridges in these hinges as is explained in NL2021823 FIGS. 16B and 18. One could also apply releasable attachments as explained in WO2016089202 in such a hinge to keep the tube in one piece and straight after processing. This combination of a 'true' hinge, combined with releasable attachments is shown in NL2021823 FIG. 16A. The main disadvantage of this 'true' hinge is that the deflection is strongly limited by the hinge geometry itself when one wants to keep the overall size of the hinge structure within acceptable limits as one can see in NL2021823 FIG. 10. Another disadvantage in a combination with elastically deformable elements is the increased bending force.

WO 2008/139768 A1, US 2009/0124857 A1, WO 2004/103430 A2 and US 2006/0199999 A1 describe instruments in which a plurality of cylindrical sections are arranged along the cylindrical axis such as to form a cylindrical element. Hinges are realized by ears or similar structures provided at the ends of the cylindrical sections, wherein the cylindrical sections are arranged such that these ears or similar structures are overlapping in a radial direction, such that a pin can be inserted through an opening in the ears in order to form a hinge. These arrangements however do not meet the requirements set herein above, i.e., that the processed tube should still be in one piece and straight for further handling, alignment and instrument assembly steps. Furthermore, these arrangements require a plurality of individual cylinder sections be brought together and aligned in order to assemble a single cylindrical or tubular element, which lead to a complex assembly procedure. Also, after assembly, a tube with these hinges will not stay straight, is very floppy and will bend easily. This makes further handling and instrument assembly, including coaxial alignment with further tubular elements, difficult.

SUMMARY OF THE INVENTION

It is an object of the invention to provide a cylindrical element with a hinge with a slotted structure which is optimized as to bendability. In an embodiment it is also an object to provide a steerable instrument for endoscopic and/or invasive type of applications provided with such a hinge.

This is achieved by a cylindrical element as claimed in claim 1.

The cylindrical element may be manufactured by a method as claimed in the independent method claim.

Embodiments of the invention are claimed in dependent claims.

The cylindrical element with the claimed hinge provides an improved bendability. The claimed instrument has strong 'true' hinges that allow high deflection and have no limited fatigue life or high bending forces because several portions can freely rotate relative to one another.

It is observed that, here, the invention will be explained in detail with reference to "cylindrical" elements. However, it is to be understood that "cylindrical" is not to be limited to circular cross sections only. Any other suitable cross section, including elliptical, rectangular, etc. may be applied.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the figures of the accompanying drawings, in which like or same reference symbols denote like, same or corresponding parts, and in which:

FIG. 2e shows a longitudinal cross-sectional view of the elongated tubular body of the steerable instrument as shown in FIG. 2b, wherein the first proximal and first distal flexible zones are bent, thereby illustrating the operation of the steering arrangement.

FIG. 2f shows a longitudinal cross-sectional view of the elongated tubular body of the steerable instrument as shown in FIG. 2e, wherein additionally the second proximal and second distal flexible zones are bent, thereby further illustrating the operation of the steering arrangement.

FIG. 4 shows a 3D view an exemplary embodiment of the invention;

FIGS. 10a and 10b show a hinge structure, which, in combination with the structure of FIG. 9a form another embodiment of the invention, which

DESCRIPTION OF EMBODIMENTS

Figure 1:
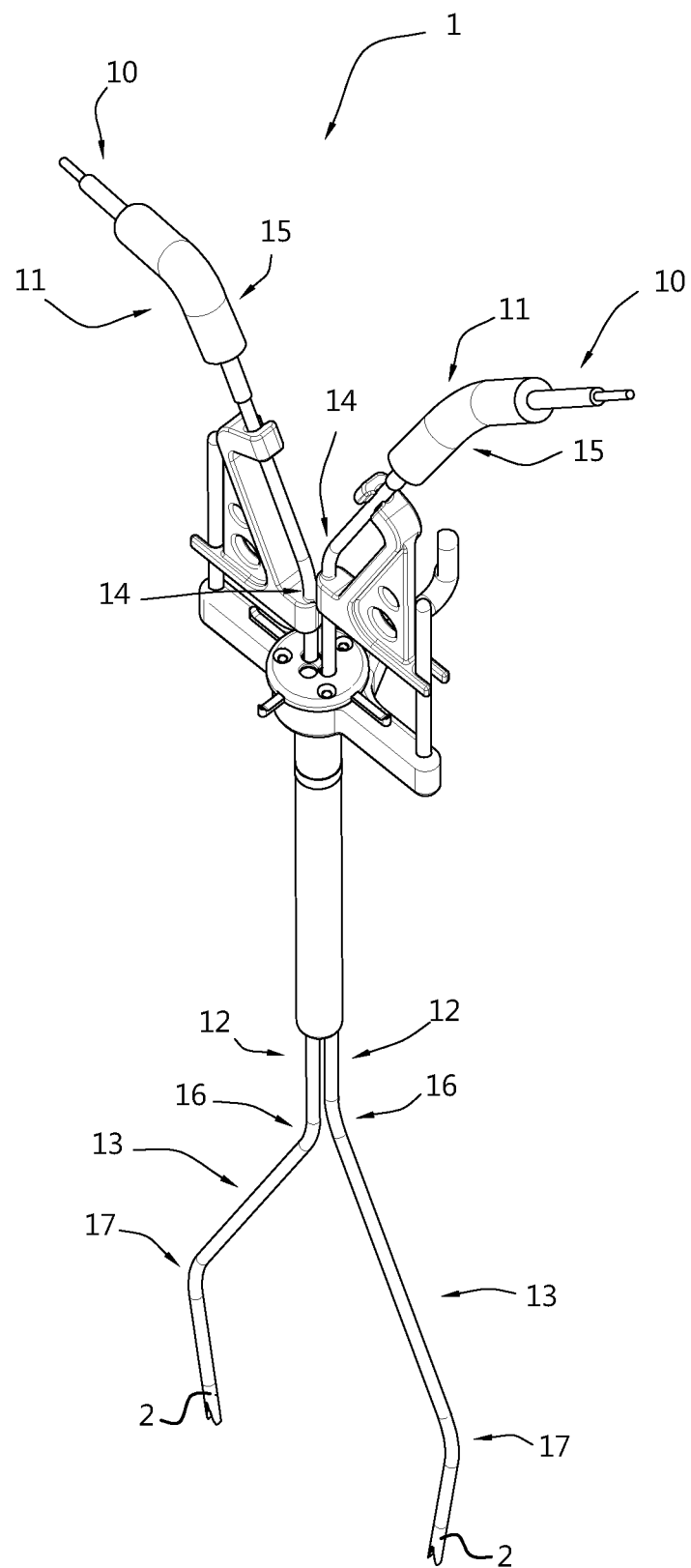
FIG. 1 shows a schematic perspective view of an invasive instrument assembly having two steerable instruments.
Figure 2A:
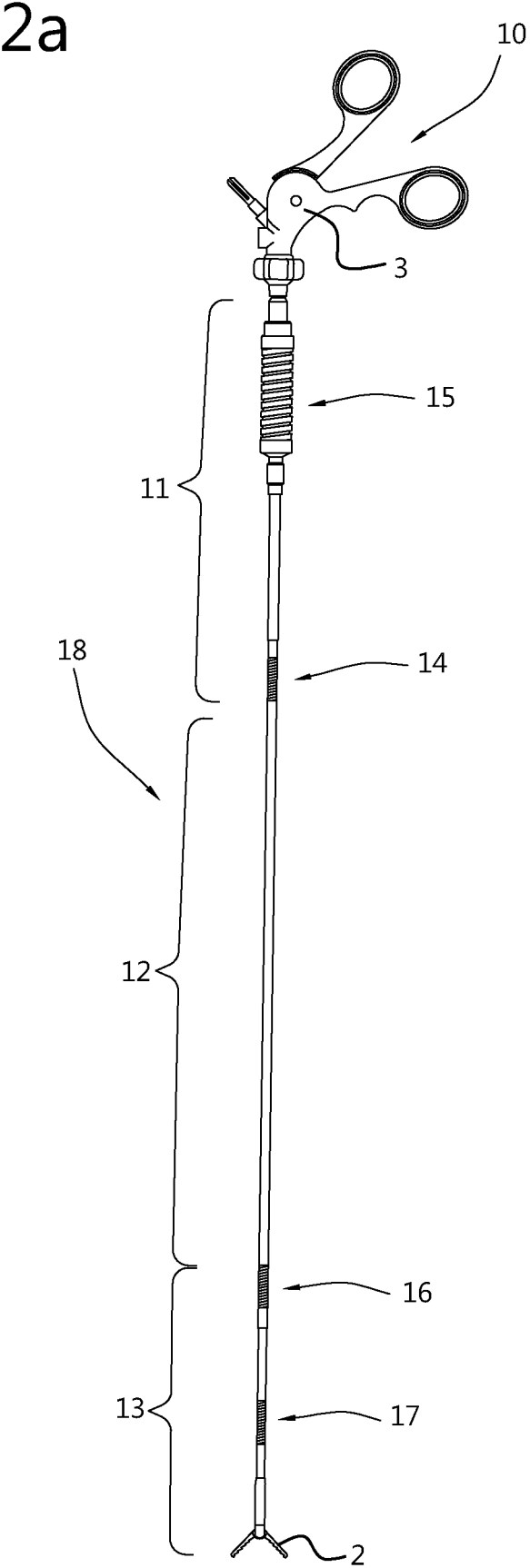
FIG. 2a shows a side view of a non-limiting embodiment of a steerable invasive instrument.

FIG. 2a shows a non-limiting embodiment of a steerable invasive instrument 10. FIG. 1 shows a non-limiting embodiment of an invasive instrument assembly 1 having an introducer with two such steerable invasive instruments 10. Details of the steerable invasive instruments 10 are explained in relation to FIGS. 2b to 2j.

FIG. 2a shows a side view of the steerable invasive instrument 10. The steerable instrument 10 comprises an elongated tubular body 18 having a proximal end part 11 including two actuation flexible zones 14, 15, a distal end part 13 including two distal flexible zones 16, 17, and an intermediate part 12. Here, the intermediate part 12 is shown to be rigid. However, in certain applications the intermediate part 12 may be flexible as will be explained in detail hereinafter. The actuation flexible zones 14, 15 in the present embodiment are configured as flexible proximal zones, and will further be referred to as flexible proximal zones. These flexible proximal zones 14, 15 are connected to the distal flexible zones by suitable longitudinal elements (not shown in FIG. 2a). Alternatively, the flexible proximal zones can be connected to the distal flexible zones by steering cables, as known in the prior art. By bending one such proximal flexible zone 14, 15, respectively, a corresponding flexible distal zone will also bend, as will be explained in detail hereinafter.

As indicated above, the intermediate part 12 may be flexible. This may be implemented by one more bendable zones. However, these bendable zones are just flexible and their bending is not controlled by another bendable zone. If desired, more than two steerable flexible distal zones can be provided. At the distal end part 13 a tool, like a forceps 2 is arranged. At the proximal end part 11 a handle 3 is arranged that is, for instance, adapted for opening and closing the jaw of the forceps 2 via, e.g., a suitable actuation cable (not shown) arranged within the instrument. Cable arrangements for doing so are well known in the art. Other tools may be provided at the distal end as known to persons skilled in the art.

Figure 2B:
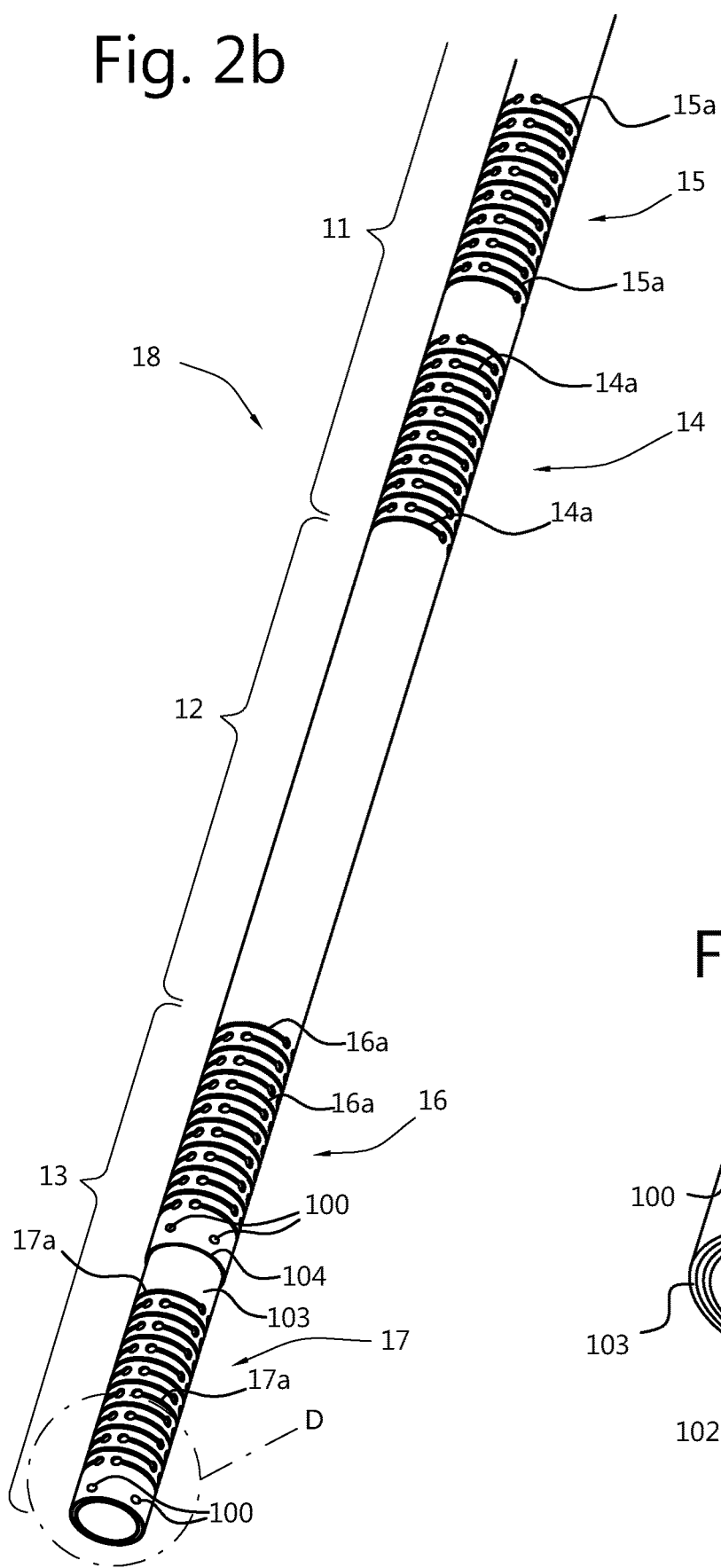
FIG. 2b provides a detailed perspective view of a non-limiting embodiment of the elongated tubular body of the steerable instrument.

FIG. 2b provides a detailed perspective view of the distal portion of the elongated tubular body 18 of the steerable instrument 10 and shows that the elongated tubular body 18 comprises a number of co-axially arranged layers or cylindrical elements including an outer cylindrical element 104 that ends after the first distal flexible zone 16 at the distal end portion 13. The distal end portion 13 of the outer cylindrical element 104 is fixedly attached to a cylindrical element 103 located inside of and adjacent to the outer cylindrical element 104, e.g. by means of spot welding at welding spots 100. However, any other suitable attachment method can be used, including any mechanical snap fit connection or gluing by a suitable glue.

Figure 2C:
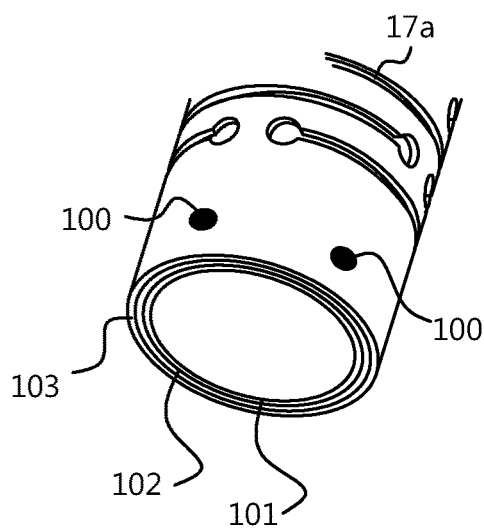
FIG. 2c provides a more detailed view of the distal end part of the elongated tubular body as shown in FIG. 2b.

FIG. 2c provides a more detailed view of the distal end part 13 and shows that, in this embodiment, it includes three co-axially arranged layers or cylindrical elements, i.e., an inner cylindrical element 101, a first intermediate cylindrical element 102 and a second intermediate cylindrical element 103. The distal ends of inner cylindrical element 101, first intermediate cylindrical element 102 and second intermediate cylindrical element 103 are all three fixedly attached to one another. This may be done by means of spot welding at welding spots 100. However, any other suitable attachment method can be used, including any mechanical snap fit connection or gluing by a suitable glue. The points of attachment may be at the end edges of inner cylindrical element 101, first intermediate cylindrical element 102 and second intermediate cylindrical element 103, as shown in the figures. However, these points of attachment may also be located some distance away from these edges, be it, preferably, between the end edges and the locations of the flexible zone 17.

It will be clear to the skilled person that the elongated tubular body 18 as shown in FIG. 2b comprises four cylindrical elements in total. The elongated tubular body 18 according to the embodiment shown in FIG. 2b comprises two intermediate cylindrical elements 102 and 103 in which the steering members of the steering arrangement are arranged.

The steering arrangement in the exemplary embodiment of the elongated tubular body 18 as shown in FIG. 2b comprises the two flexible zones 14, 15 at the proximal end part 11 of the elongated tubular body 18, the two flexible zones 16, 17 at the distal end part 13 of the elongated tubular body 18 and the steering members that are arranged between related flexible zones at the proximal 11 and distal 13 end parts. An exemplary actual arrangement of the steering members is shown in FIG. 2d, which provides a schematic longitudinal cross-sectional view of the exemplary embodiment of the elongated tubular body 18 as shown in FIG. 2b.

Figure 2D:
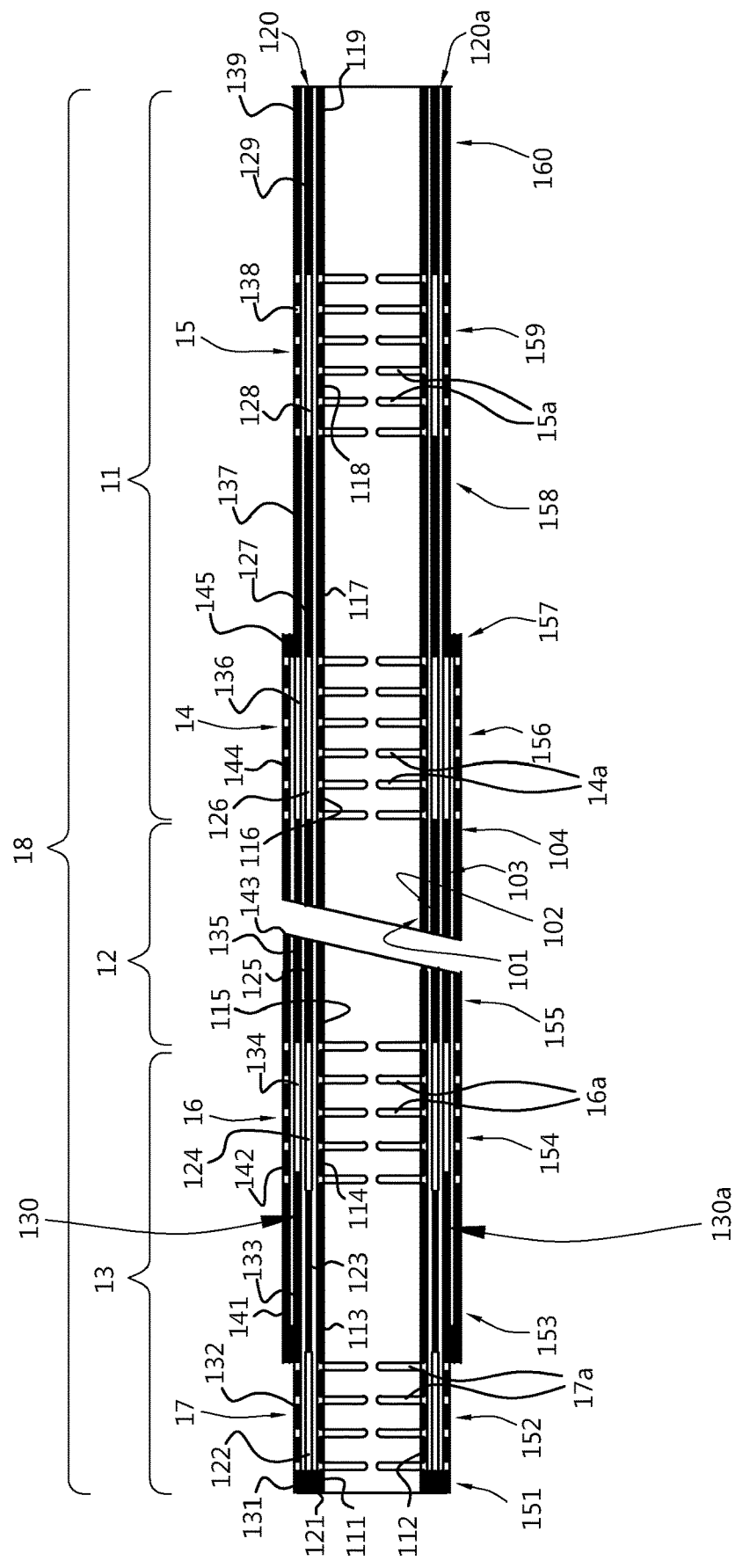
FIG. 2d shows a longitudinal cross-sectional view of the elongated tubular body of the steerable instrument as shown in FIG. 2b.

FIG. 2d shows a cross section of the four layers or cylindrical elements mentioned above, i.e. the inner cylindrical element 101, the first intermediate cylindrical element 102, the second intermediate cylindrical element 103, and the outer cylindrical element 104.

The inner cylindrical element 101, as seen along its length from the distal end to the proximal end of the instrument, comprises a rigid ring 111, which is arranged at the distal end part 13 of the steerable instrument 10, a first flexible portion 112, a first intermediate rigid portion 113, a second flexible portion 114, a second intermediate rigid portion 115, a third flexible portion 116, a third intermediate rigid portion 117, a fourth flexible portion 118, and a rigid end portion 119, which is arranged at the proximal end portion 11 of the steerable instrument 10.

The first intermediate cylindrical element 102, as seen along its length from the distal end to the proximal end of the instrument, comprises a rigid ring 121, a first flexible portion 122, a first intermediate rigid portion 123, a second flexible portion 124, a second intermediate rigid portion 125, a third flexible portion 126, a third intermediate rigid portion 127, a fourth flexible portion 128, and a rigid end portion 129. The portions 122, 123, 124, 125, 126, 127 and 128 together form a longitudinal element 120 that can be moved in the longitudinal direction like a wire. The longitudinal dimensions of the rigid ring 121, the first flexible portion 122, the first intermediate rigid portion 123, the second flexible portion 124, the second intermediate rigid portion 125, the third flexible portion 126, the third intermediate rigid portion 127, the fourth flexible portion 128, and the rigid end portion 129 of the first intermediate element 102, respectively, are aligned with, and preferably approximately equal to the longitudinal dimensions of the rigid ring 111, the first flexible portion 112, the first intermediate rigid portion 113, the second flexible portion 114, the second intermediate rigid portion 115, the third flexible portion 116, the third intermediate rigid portion 117, the fourth flexible portion 118, and the rigid end portion 119 of the inner cylindrical element 101, respectively, and are coinciding with these portions as well. In this description "approximately equal" means that respective same dimensions are equal within a margin of less than 10%, preferably less than 5%.

Similarly, the first intermediate cylindrical element 102 comprises one or more other longitudinal elements of which one is shown with reference number 120a.

The second intermediate cylindrical element 103, as seen along its length from the distal end to the proximal end of the instrument, comprises a first rigid ring 131, a first flexible portion 132, a second rigid ring 133, a second flexible portion 134, a first intermediate rigid portion 135, a first intermediate flexible portion 136, a second intermediate rigid portion 137, a second intermediate flexible portion 138, and a rigid end portion 139. The portions 133, 134, 135 and 136 together form a longitudinal element 130 that can be moved in the longitudinal direction like a wire. The longitudinal dimensions of the first rigid ring 131, the first flexible portion 132 together with the second rigid ring 133 and the second flexible portion 134, the first intermediate rigid portion 135, the first intermediate flexible portion 136, the second intermediate rigid portion 137, the second intermediate flexible portion 138, and the rigid end portion 139 of the second intermediate cylinder 103, respectively, are aligned with, and preferably approximately equal to the longitudinal dimensions of the rigid ring 111, the first flexible portion 112, the first intermediate rigid portion 113, the second flexible portion 114, the second intermediate rigid portion 115, the third flexible portion 116, the third intermediate rigid portion 117, the fourth flexible portion 118, and the rigid end portion 119 of the first intermediate element 102, respectively, and are coinciding with these portions as well.

Similarly, the second intermediate cylindrical element 103 comprises one or more other longitudinal elements of which one is shown with reference number 130a.

The outer cylindrical element 104, as seen along its length from the distal end to the proximal end of the instrument, comprises a first rigid ring 141, a first flexible portion 142, a first intermediate rigid portion 143, a second flexible portion 144, and a second rigid ring 145. The longitudinal dimensions of the first flexible portion 142, the first intermediate rigid portion 143 and the second flexible portion 144 of the outer cylindrical element 104, respectively, are aligned with, and preferably approximately equal to the longitudinal dimension of the second flexible portion 134, the first intermediate rigid portion 135 and the first intermediate flexible portion 136 of the second intermediate element 103, respectively, and are coinciding with these portions as well. The rigid ring 141 has approximately the same length as the rigid ring 133 and is fixedly attached thereto, e.g. by spot welding or gluing. Preferably, the rigid ring 145 overlaps with the second intermediate rigid portion 137 only over a length that is required to make an adequate fixed attachment between the rigid ring 145 and the second intermediate rigid portion 137, respectively, e.g. by spot welding or gluing. The rigid rings 111, 121 and 131 are attached to each other, e.g., by spot welding or gluing. This may be done at the end edges thereof but also at a distance of these end edges.

In an embodiment, the same may apply to the rigid end portions 119, 129 and 139, which can be attached together as well in a comparable manner. However, the construction may be such that the diameter of the cylindrical elements at the proximal portion is larger, or smaller, with respect to the diameter at the distal portion. In such embodiment the construction at the proximal portion differs from the one shown in FIG. 2d. As a result of the increase or decrease in diameter an amplification or attenuation is achieved, i.e., the bending angle of a flexible zone at the distal portion will be larger or smaller than the bending angle of a corresponding flexible portion at the proximal portion.

The inner and outer diameters of the cylindrical elements 101, 102, 103, and 104 are chosen in such a way at a same location along the elongated tubular body 18 that the outer diameter of inner cylindrical element 101 is slightly less than the inner diameter of the first intermediate cylindrical element 102, the outer diameter of the first intermediate cylindrical element 102 is slightly less than the inner diameter of the second intermediate cylindrical element 103 and the outer diameter of the second intermediate cylindrical element 103 is slightly less than the inner diameter of the outer cylindrical element 104, in such a way that a sliding movement of the adjacent cylindrical elements with respect to each other is possible. The dimensioning should be such that a sliding fit is provided between adjacent elements. A clearance between adjacent elements may generally be in the order of 0.02 to 0.1 mm, but depends on the specific application and material used. The clearance preferably is smaller than a wall thickness of the longitudinal elements to prevent an overlapping configuration thereof. Restricting the clearance to about 30% to 40% of the wall thickness of the longitudinal elements is generally sufficient.

As can be seen in FIG. 2d, flexible zone 14 of the proximal end part 11 is connected to the flexible zone 16 of the distal end part 13 by portions 134, 135 and 136, of the second intermediate cylindrical element 103, which form a first set of longitudinal steering members of the steering arrangement of the steerable instrument 10. Furthermore, flexible zone 15 of the proximal end part 11 is connected to the flexible zone 17 of the distal end part 13 by portions 122, 123, 124, 125, 126, 127, and 128 of the first intermediate cylindrical element 102, which form a second set of longitudinal steering members of the steering arrangement. The use of the construction as described above allows the steerable instrument 10 to be used for double bending. The working principle of this construction will be explained with respect to the examples shown in FIGS. 2e and 2f.

For the sake of convenience, as shown in FIGS. 2d, 2e and 2f, the different portions of the cylindrical elements 101, 102, 103, and 104 have been grouped into zones 151-160 that are defined as follows. Zone 151 comprises the rigid rings 111, 121, and 131. Zone 152 comprises the portions 112, 122, and 132. Zone 153 comprises the rigid rings 133 and 141 and the portions 113 and 123. Zone 154 comprises the portions 114, 124, 134 and 142. Zone 155 comprises the portions 115, 125, 135 and 143. Zone 156 comprises the portions 116, 126, 136 and 144. Zone 157 comprises the rigid ring 145 and the parts of the portions 117, 127, and 137 coinciding therewith. Zone 158 comprises the parts of the portions 117, 127, and 137 outside zone 157. Zone 159 comprises the portions 118, 128 and 138. Finally, zone 160 comprises the rigid end portions 119, 129 and 139.

In order to deflect at least a part of the distal end part 13 of the steerable instrument 10, it is possible to apply a bending force, in any radial direction, to zone 158. According to the examples shown in FIGS. 2e and 2f, zone 158 is bent downwards with respect to zone 155. Consequently, zone 156 is bent downwards. Because of the first set of steering members comprising portions 134, 135, and 136 of the second intermediate cylindrical element 103 that are arranged between the second intermediate rigid portion 137 and the second rigid ring 133, the downward bending of zone 156 is transferred by a longitudinal displacement of the first set of steering members into an upward bending of zone 154 with respect to zone 155. This is shown in both FIGS. 2e and 2f.

It is to be noted that the exemplary downward bending of zone 156, only results in the upward bending of zone 154 at the distal end of the instrument as shown in FIG. 2e. Bending of zone 152 as a result of the bending of zone 156 is prevented by zone 153 that is arranged between zones 152 and 154. When subsequently a bending force, in any radial direction, is applied to the zone 160, zone 159 is also bent. As shown in FIG. 2f, zone 160 is bent in an upward direction with respect to its position shown in FIG. 2e. Consequently, zone 159 is bent in an upward direction. Because of the second set of steering members comprising portions 122, 123, 124, 125, 126, 127 and 128 of the first intermediate cylindrical element 102 that are arranged between the rigid ring 121 and the rigid end portion 129, the upward bending of zone 159 is transferred by a longitudinal displacement of the second set of steering members into a downward bending of zone 152 with respect to its position shown in FIG. 2e.

FIG. 2f further shows that the initial bending of the instrument in zone 154 as shown in FIG. 2e will be maintained because this bending is only governed by the bending of zone 156, whereas the bending of zone 152 is only governed by the bending of zone 159 as described above. Due to the fact that zones 152 and 154 are bendable independently with respect to each other, it is possible to give the distal end part 13 of the steerable instrument 10 a position and longitudinal axis direction that are independent from each other. In particular the distal end part 13 can assume an advantageous S-like shape. The skilled person will appreciate that the capability to independently bend zones 152 and 154 with respect to each other, significantly enhances the maneuverability of the distal end part 13 and therefore of the steerable instrument 10 as a whole.

Obviously, it is possible to vary the lengths of the flexible portions shown in FIGS. 2d to 2f as to accommodate specific requirements with regard to bending radii and total lengths of the distal end part 13 and the proximal end part 11 of the steerable instrument 10 or to accommodate amplification or attenuation ratios between bending of at least a part of the proximal end part 11 and at least a part of the distal end part 13.

The steering members comprise one or more sets of longitudinal elements that form integral parts of the one or more intermediate cylindrical elements 102, 103. Preferably, the longitudinal elements comprise remaining parts of the wall of an intermediate cylindrical element 102, 103 after the wall of the intermediate cylindrical element 102, 103 has been provided with longitudinal slits that define the remaining longitudinal steering elements.

Figure 2G:
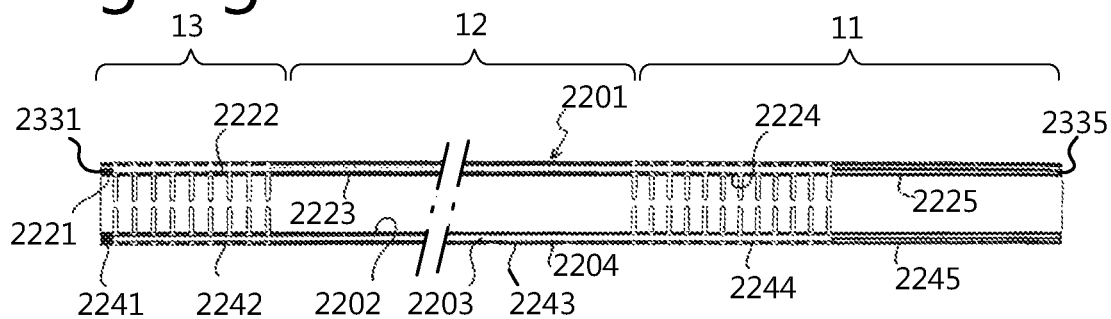
FIG. 2g shows a longitudinal cross-sectional view of an exemplary embodiment of a steerable instrument having one proximal and one distal flexible zone.
Figure 2H:
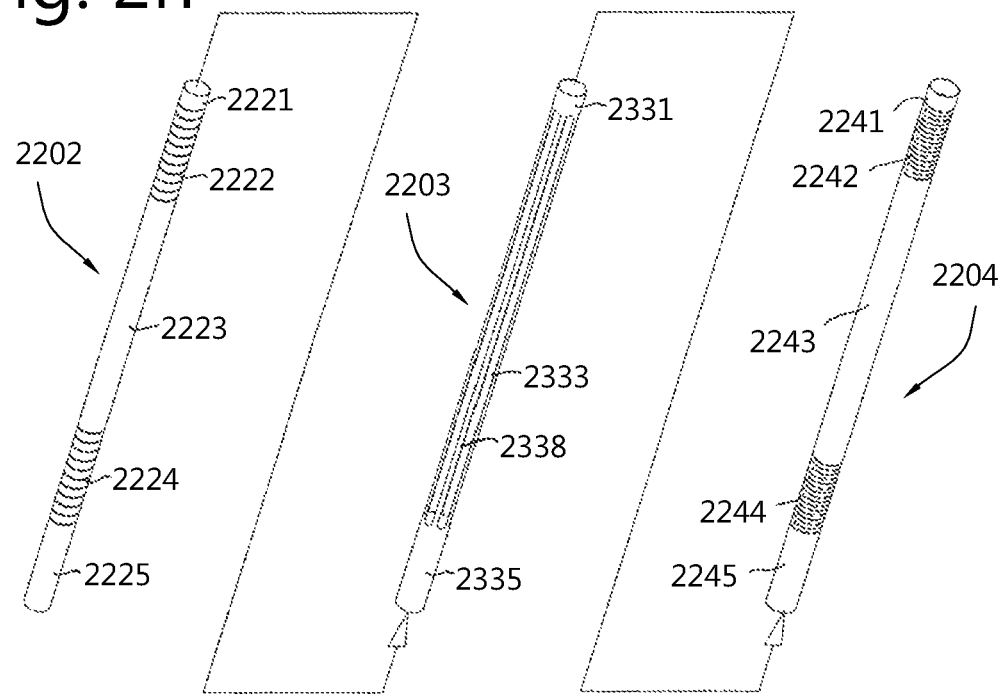
FIG. 2h shows a perspective exploded view of the three cylindrical elements of the steerable instrument shown in FIG. 2g.
Figure 2I:
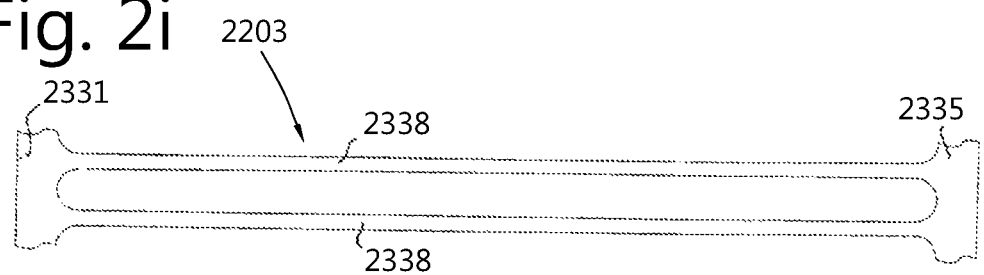
FIG. 2i shows a top view of an unrolled version of an exemplary embodiment of the intermediate cylindrical element of the steerable instrument shown in FIG. 2h. The intermediate cylindrical element can be formed by rolling the unrolled version into a cylindrical configuration and attaching adjacent sides of the rolled-up configuration by any known attaching means such as by a welding technique.

Further details regarding the fabrication of the latter longitudinal steering elements are provided with reference to FIGS. 2g to 2i regarding an exemplary embodiment of a steerable instrument that comprises only one flexible zone at both its proximal 11 and distal end 13 parts.

FIG. 2g shows a longitudinal cross-section of a steerable instrument 2201 comprising three co-axially arranged cylindrical elements, i.e. inner cylindrical element 2202, intermediate cylindrical element 2203 and outer cylindrical element 2204. Suitable materials to be used for making the cylindrical elements 2202, 2203, and 2204 include stainless steel, cobalt-chromium, shape memory alloy such as Nitinol®, plastic, polymer, composites or other cuttable material. Alternatively, the cylindrical elements can be made by a 3D printing process.

The inner cylindrical element 2202 comprises a first rigid end part 2221, which is located at the distal end part 13 of the instrument 2201, a first flexible part 2222, an intermediate rigid part 2223, a second flexible part 2224 and a second rigid end part 2225, which is located at the proximal end part 11 of the instrument 2201.

The outer cylindrical element 2204 also comprises a first rigid end part 2241, a first flexible part 2242, an intermediate rigid part 2243, a second flexible part 2244 and a second rigid end part 2245. The lengths of the parts 2221, 2222, 2223, 2224, and 2225, respectively, of the cylindrical element 2202 and the parts 2241, 2242, 2243, 2244, and 2245, respectively, of the cylindrical element 2204 are, preferably, substantially the same so that when the inner cylindrical element 2202 is inserted into the outer cylindrical element 2204, these different respective parts are longitudinally aligned with each other.

The intermediate cylindrical element 2203 also has a first rigid end part 2331 and a second rigid end part 2335 which in the assembled condition are located between the corresponding rigid parts 2221, 2241 and 2225, 2245 respectively of the two other cylindrical elements 2202, 2204. The intermediate part 2333 of the intermediate cylindrical element 2203 comprises three or more separate longitudinal elements which can have different forms and shapes as will be explained below. After assembly of the three cylindrical elements 2202, 2203 and 2204 whereby the element 2202 is inserted in the element 2203 and the two combined elements 2202, 2203 are inserted into the element 2204, at least the first rigid end part 2221 of the inner cylindrical element 2202, the first rigid end part 2331 of the intermediate cylindrical element 2203 and the first rigid end part 2241 of the outer cylindrical element 2204 at the distal end of the instrument are attached to each other. In the embodiment shown in FIGS. 2g and 2h, also the second rigid end part 2225 of the inner cylindrical element 2202, the second rigid end part 2335 of the intermediate cylindrical element 2203 and the second rigid end part 2245 of the outer cylindrical element 2204 at the proximal end of the instrument are attached to each other such that the three cylindrical elements 2202, 2203, 2204 form one integral unit.

In the embodiment shown in FIG. 2h the intermediate part 2333 of intermediate cylindrical element 2203 comprises a number of longitudinal elements 2338 with a uniform cross-section so that the intermediate part 2333 has the general shape and form as shown in the unrolled condition of the intermediate cylindrical element 2203 in FIG. 2i. From FIG. 2i it also becomes clear that the intermediate part 2333 is formed by a number of over the circumference of the intermediate cylindrical part 2203 equally spaced parallel longitudinal elements 2338. Advantageously, the number of longitudinal elements 2338 is at least three, so that the instrument 2201 becomes fully controllable in any direction, but any higher number is possible as well. Preferably, the number of longitudinal elements 2338 is 6 or 8.

The production of such an intermediate part is most conveniently done by injection moulding or plating techniques or starting from a cylindrical tube with the desired inner and outer diameters and removing parts of the wall of the cylindrical tube required to end up with the desired shape of the intermediate cylindrical element 2203. However, alternatively, any 3D printing method can be used.

The removal of material can be done by means of different techniques such as laser cutting, photochemical etching, deep pressing, conventional chipping techniques such as drilling or milling, high pressure water jet cutting systems or any suitable material removing process available. Preferably, laser cutting is used as this allows for a very accurate and clean removal of material under reasonable economic conditions. The above mentioned processes are convenient ways as the member 2203 can be made so to say in one process, without requiring additional steps for connecting the different parts of the intermediate cylindrical element as required in the conventional instruments, where conventional steering cables must be connected in some way to the end parts. The same type of technology can be used for producing the inner and outer cylindrical elements 2202 and 2204 with their respective flexible parts 2222, 2224, 2242 and 2244.

Figure 3:
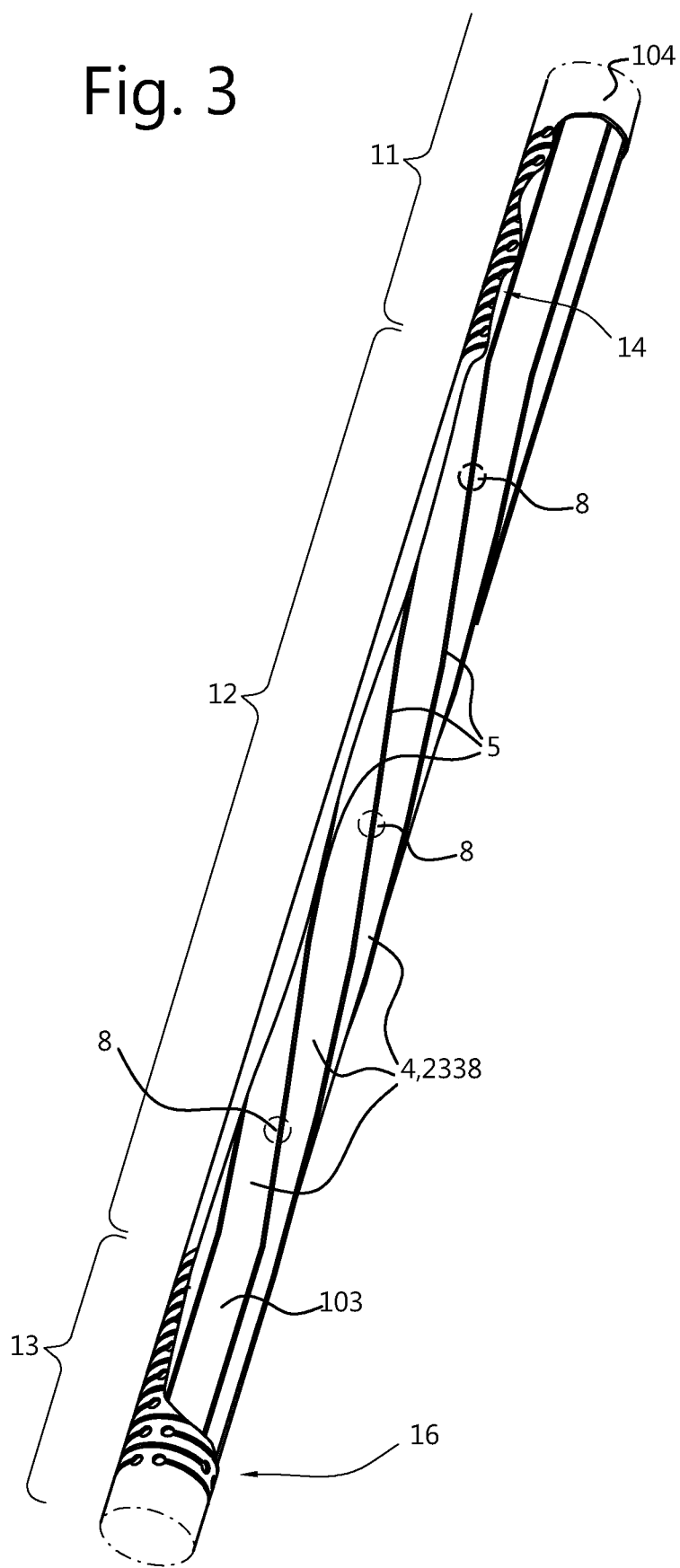
FIG. 3 shows a perspective view of a part of the elongated tubular body as shown in FIG. 2b, wherein the outer cylindrical element partially has been removed to show an exemplary embodiment of the longitudinal steering elements that have been obtained after providing longitudinal slits to the wall of an intermediate cylindrical element that interconnects the first proximal flexible zone and the first distal flexible zone of the elongated tubular body.

FIG. 3 shows an exemplary embodiment of longitudinal (steering) elements 4 that have been obtained after providing longitudinal slits 5 to the wall of the second intermediate cylindrical element 103 that interconnects proximal flexible zone 14 and distal flexible zone 16 as described above. I.e., longitudinal steering elements 4 are, at least in part, spiraling about a longitudinal axis of the instrument such that an end portion of a respective steering element 4 at the proximal portion of the instrument is arranged at another angular orientation about the longitudinal axis than an end portion of the same longitudinal steering element 4 at the distal portion of the instrument. Were the longitudinal steering elements 4 arranged in a linear orientation, than a bending of the instrument at the proximal portion in a certain plane would result in a bending of the instrument at the distal portion in the same plane but in a 180 degrees opposite direction. This spiral construction of the longitudinal steering elements 4 allows for the effect that bending of the instrument at the proximal portion in a certain plane may result in a bending of the instrument at the distal portion in another plane, or in the same plane in the same direction. A preferred spiral construction is such that the end portion of a respective steering element 4 at the proximal portion of the instrument is arranged at an angularly shifted orientation of 180 degrees about the longitudinal axis relative to the end portion of the same longitudinal steering element 4 at the distal portion of the instrument. However, e.g. any other angularly shifted orientation, e.g. 90 degrees, is within the scope of this document. The slits are dimensioned such that movement of a longitudinal element is guided by adjacent longitudinal elements when provided in place in a steerable instrument.

The flexible portions 112, 132, 114, 142, 116, 144, 118, and 138 as shown in FIG. 2d, as well as the flexible parts 2222, 2224, 2242, and 2244 shown in FIGS. 2g and 2h can be obtained by the methods described in European patent application 08 004 373.0 filed on 10 Mar. 2008, page 5, lines 15-26, but any other suitable process can be used to make flexible portions.

Such flexible parts may have a structure as shown in FIGS. 2b and 2c. I.e., the flexibility may be obtained by a plurality of slits 14a, 15a, 16a, 17a. E.g., two circumferential slits may be provided in a cylindrical element along a same circumferential line where both slits are located at a certain distance from one another. A plurality of identical sets of circumferential slits 14a, 15a, 16a, 17a is provided at a plurality of distances in the longitudinal direction of the instrument, where consecutive sets are arranged at an angularly rotated position, e.g. each time 90 degrees rotated. In such an arrangement, all parts of the cylindrical element are still connected to each other.

Furthermore, if the portions 122, 123, 124, 125, 126, 127, and 128 of the first intermediate cylindrical element 102 and the portions 134, 135, and 136 of the second intermediate cylindrical element 103 that respectively form the first and second set of longitudinal steering members, as shown in FIG. 2d, are implemented as longitudinal steering elements 4 as shown in FIG. 2h, the fabrication methods described above can be used. The same applies to the longitudinal elements 2338 of FIGS. 2h and 2i. Moreover, any embodiment described in EP 2 762 058 A can be used according to the invention.

Otherwise, the longitudinal elements 4, 2338 can also be obtained by any other technique known in the art such as for example described in EP 1 708 609 A. The only restriction with respect to the construction of the longitudinal elements used in these portions is that the total flexibility of the instrument in these locations where the flexible portions coincide must be maintained.

The different co-axially arranged layers or cylindrical elements 101, 102, 103, 104, 2202, 2203 and 2204 as described above in relation to the exemplary embodiments of the steerable instruments shown in FIGS. 2d, 2e and 2f, respectively, may be produced by any of the known methods, provided that they are suitable to make a multilayer system. A multilayer system is to be understood as being a steerable instrument that comprises at least two separate sets of longitudinal elements 4, 2338 for transferring the movement of the proximal end part to the distal end part. The assembly of the different cylindrical elements can be realized in the same way as well. Preferred methods of producing the different cylindrical elements have been described in the above mentioned EP 2 762 058 A which is hereby incorporated by reference in its entirety.

In the above embodiments, the proximal portions and distal portions are constructed in a similar way. However, that need not always be the case as will become apparent hereinafter.

FIG. 4 shows a 3D view of an example of a steerable instrument. Like reference numbers refer to the same elements as in other figures. Their explanation is not repeated here. The instruments comprises five coaxial cylindrical elements 202-210. An inner cylindrical element 210 is surrounded by intermediate cylindrical element 208 which is surrounded by intermediate cylindrical element 206 which is surrounded by intermediate cylindrical element 204 which is, finally surrounded by outer cylindrical element 202. Inner intermediate cylindrical element may be made of a flexible spiraling spring. The proximal and distal ends, respectively, of the instrument are indicated with reference numbers 226 and 227, respectively.

As shown, here, instrument 18 comprises a flexible zone 19 in its intermediate part between flexible zone 14 and flexible zone 16. I.e., intermediate cylindrical element 204 (which is located at the outer side in the area of flexible zone 19) is provided with a slotted structure to provide intermediate cylindrical element with a desired flexibility. The longitudinal length of the slotted structure in flexible zone 19 depends on the desired application. It may be as long as the entire part between flexible zones 14 and 16. All other cylindrical elements 206, 208, 210 inside intermediate cylindrical element 204 are also flexible in flexible zone 19. Those cylindrical elements that have longitudinal elements in the flexible zone 19 are flexible by way of definition. Others are provided with suitable hinges, preferably made by suitable slotted structures.

In accordance with the invention, at least one of the slotted structures has a special design as will be explained in detail below. This structure may be applied at any location where the instrument explained with reference to the above figures has a hinge.

Figure 5A:
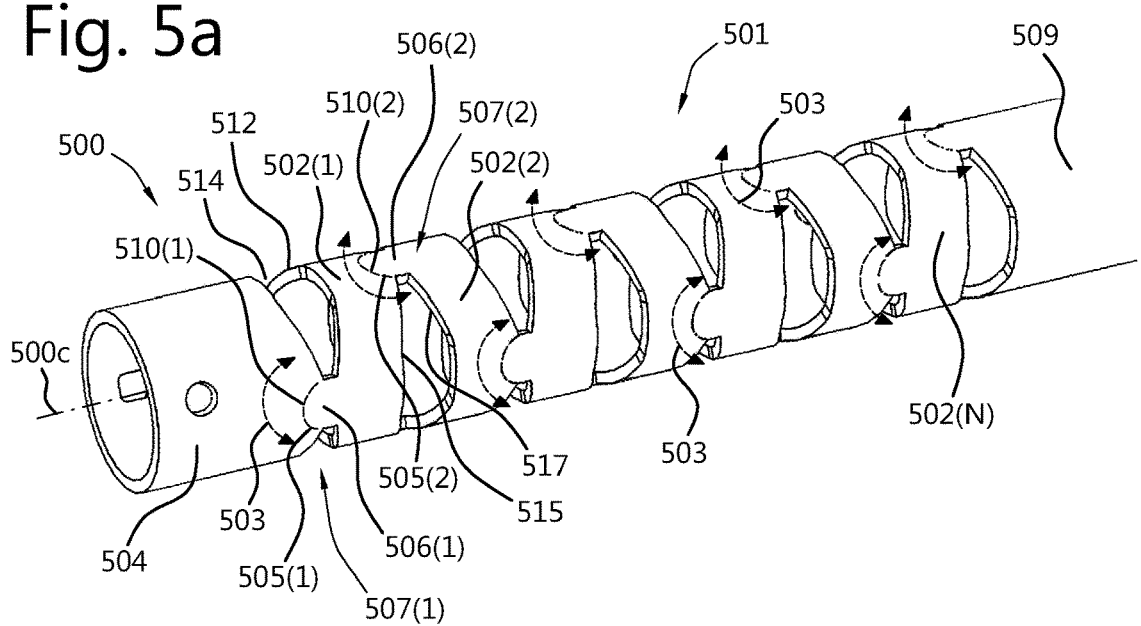
FIGS. 5a-5d show hinge structures in accordance with an embodiment of the invention.

FIG. 5a shows a cylindrical element 500 with a hinge 501 made as a slotted structure. The cylindrical element 500 comprises a portion 504 and a further portion 509 opposite to portion 504. Hinge 501 is located in between them.

Hinge 501 comprises a plurality of hinge portions 502(1), 502(2), . . . 502(n), . . . , 502(N) (N being an integer number being larger than 1). In the shown example, each hinge portion 502(n) has an identical shape but that is not necessarily so. Each shown hinge portion 502(n) is a rigid ring shaped portion of cylindrical element 500.

Portion 504 and hinge portion 502(1) are rotatable relative to one another by means of two rotatable sections 507(1) (one visible in FIG. 5a) located 180° rotated relative to one another in the tangential direction of cylindrical element 500. To that effect, ring shaped portion 502(1) is provided with two extensions 506(1) (only one visible in FIG. 5a) arranged 180° opposite to each other as seen in the tangential direction of the cylindrical element 500. That is, the two rotatable sections 507(1), and the associated two extensions 506(1), are located at the same position along a central axis 500c (cylinder axis) and such that a line interconnecting the two rotatable sections and the two extensions intersect the central axis at a right angle. Each extension 506(1) has a circular outer edge oriented towards portion 504. Portion 504 is provided with two notches 505(1) (only one visible in FIG. 5a) arranged 180° opposite to each other as seen in the tangential direction of the cylindrical element 500. Each notch 505(1) has a circular inner edge of a same or slightly larger radius as the circular outer edge of extension 506(1), such as to enable rotation of the extension 506(1) within the notch 505(1). Each notch 505(1) accommodates one extension 506(1).

Preferably, extension 506(1) and notch 505(1) are made by cutting a circular shaped slot through cylindrical element 500, e.g. by laser cutting or water cutting. Any other cutting technique may be used instead. In an example, the cutting process is performed such that the slot is interrupted by small bridges 510(1) such that extension 506(1) and notch 505(1) are still attached to each other. These bridges operate as "fracture elements" as explained in detail in patent application WO 2016/089202 A1 as well as in non-prepublished patent application PCT/NL2019/050680. These bridges, or fracture elements, are made on purpose when the cylindrical element, and the instrument, is manufactured but are intentionally made so weak that they will break once a force above a certain threshold is applied to them. Here they are designed such that they will break once portion 504 and hinge portion 502(1) are rotated relative to one another about the two extensions 506(1) with at least such a threshold force, as shown with double arrow 503. The threshold force is selected such that the bridges 510(1) will break before either one of portion 504 or hinge portion 502(1) will deform beyond its maximum elasticity due the exerted rotation force. As will be explained hereinafter, they are only broken later during the manufacturing process. Before breaking, the fracture elements, e.g. the bridges 510(1), provide the cylindrical element with a predetermined extra stiffness such that the cylindrical element can be maneuvered more easily when inserting the cylindrical element inside another cylindrical element or inserting another cylindrical element in the cylindrical element. Once broken, the fracture elements play no role anymore and the extension 506(1) can rotate in the notch 505(1).

Such fracture elements can be made as follows. The slot is, e.g., made by directing a laser beam, or water beam, with a predetermined energy and width to the cylinder element such as to cut through the entire thickness of the cylinder element. The laser beam moves relative to the cylinder element's outer surface by moving a laser source relative to that outer surface. However, at locations where fracture elements are to be formed, the laser beam is interrupted for a certain period of time whereas the laser source still moves relative to the cylinder element outer surface.

As explained above, when deflecting different portions of the slotted structure relative to one another for the first time, these fracture elements will fracture. A great advantage of such fracture elements 89 is that, after being fractured, the distance between two opposite sides of the fracture element is substantially 0 µm which results in an extremely low play between them.

These kind of fracture elements can be applied between any elements or portions of the cylinder elements and in the instrument as described herein, which are formed by laser cutting.

The fracture elements should be designed in the following way. Before being fractured, each fracture element is attached to opposite portions of a cylinder element. These opposite portions of the cylinder element have respective yield stress values defining the force above which a permanent deformation of these opposite portions occurs. Moreover, each fracture element has a respective fracture tensile stress value defining the force to be applied to fracture the fracture element. The tensile stress value of each fracture element should be lower than the yield stress values of these opposite portions of cylinder element. For instance, the tensile stress value of each fracture element is in a range of 1%-80% of the yield stress of these portions of the cylinder element. This range may, alternatively, be 1%-50%.

Portion 504 is provided with an outer edge 514 facing an outer edge 512 of hinge portion 502(1). Outer edge 514 and outer edge 512 define an open space between them such that, once the bridges 510(1) are broken, portion 504 and hinge portion 502(1) can freely rotate relative to one another about extensions 506(1) until a predetermined bending angle which is reached when outer edges 514 and 512 touch one another.

Outer edges 514 and 512 result from cutting, e.g. laser cutting or water cutting through cylindrical element 500. All adjacent hinge portions 502(n), 502(n+1) have open spaces between them like the spaces as defined between portion 504 and hinge portion 502(1) resulting from cutting, e.g. laser cutting or water cutting. These spaces are alternately rotated 90° viewed in the tangential direction of cylindrical element 500.

Hinge portion 502(1) has a further outer edge 515 facing an outer edge 517 of hinge portion 502(2). Outer edge 515 is provided with two circular shaped notches 505(2) (one visible in FIG. 5a) arranged 180° opposite to each other as seen in the tangential direction of the cylindrical element 500. Each circular shaped notch 505(2) accommodates a circular shaped extension 506(2) of hinge portion 502(2). Each combination of notch 505(2) and extension 506(2) is at a location rotated 90° relative to a combination of notch 505(1) and extension 506(1). Like combinations of notch 505(1) and extension 506(1), combinations of notch 505(2) and extension 506(2) are, in an example, made by cutting a circular shaped slot through cylindrical element 500, e.g. by laser cutting or water cutting. Any other cutting technique may be used instead. In an example, the cutting is performed such that the slot is interrupted by small bridges 510(2) similar to bridges 510(1) such that extension 506(2) and notch 505(2) are still attached to each other. These bridges also operate as "fracture elements" as explained above.

Because successive pairs of rotatable sections 507(n), 507(n+1) are rotated about 90° relative to one another as viewed in the tangential direction of cylindrical element 500, hinge portion 502(n−1) and hinge portion 502(n) can rotate relative to each other in a first direction perpendicular to a second direction of rotation of hinge portion 502(n) relative to hinge portion 502(n+1). As shown, the directions of rotation between successive hinge portions alternate between said first and second directions causing the hinge 501 to be flexible in all directions.

In an example, each notch 505(n) is still attached to extension 506(n) it accommodates by means of bridges similar or identical to bridges 510(1) once a slot is made between them. So, after the cylindrical element structure 500 of FIG. 5a is made, in such an example, all adjacent portions and hinge portions are still attached to each other and the structure will not fall apart in separate pieces. Therefore, once ready, the cylindrical element structure 500 of FIG. 5a can be inserted into cylindrical element structure 520 shown in FIG. 5b as an integral unit. This cylindrical element 520 can also be made as an integral element in which all different portions and hinge portions are still attached to each other by means of fracture elements before the total hinge structure is used in a bending action.

Figure 5B:
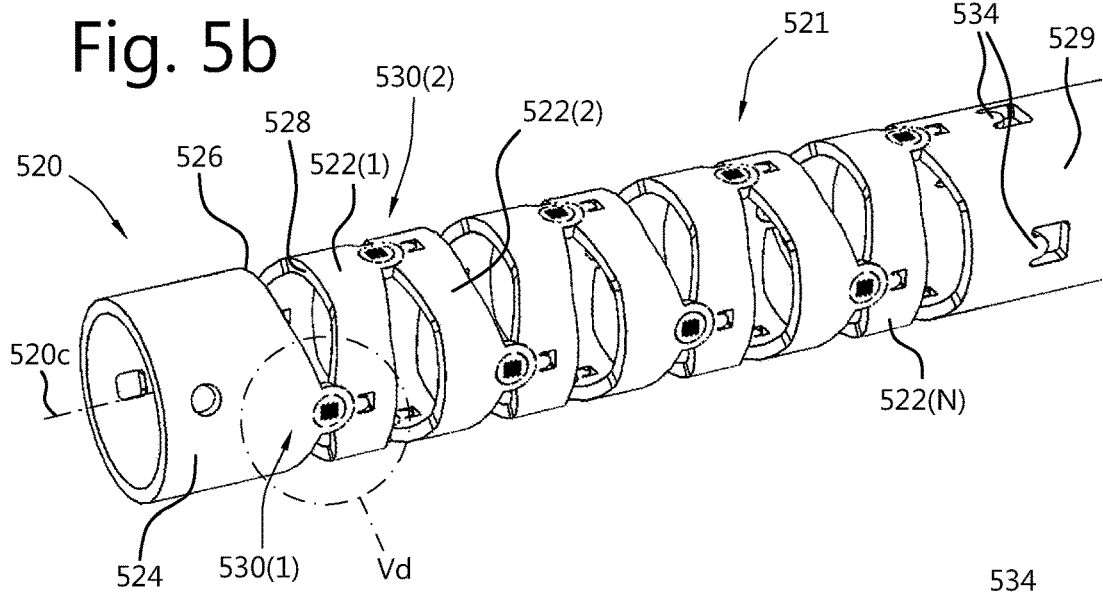

FIG. 5b shows cylindrical element 520 in detail.

FIG. 5b shows cylindrical element 520 with a hinge 521 made as a slotted structure. The cylindrical element 520 comprises a portion 524 and a further portion 529 opposite to portion 524. Hinge 521 is located in between them.

Hinge 521 comprises a plurality of hinge portions 522(1), 522(2), . . . 522(n), . . . , 522(N) (N being an integer number being larger than 1). In the shown example, each hinge portion 522(n) has an identical shape but that is not necessarily so. Each shown hinge portion 522(n) is a rigid ring shaped portion of cylindrical element 520.

Portion 524 and hinge portion 522(1) are arranged to be rotatable relative to one another by means of two rotatable sections 530(1) (only one visible in FIG. 5b) located 180° rotated relative to each other as seen in the tangential direction of cylindrical element 521. One such rotatable section 530 is shown in detail in FIG. 5d, as indicated with dotted circle Vd in FIG. 5b. In analogy to the rotatable sections 507(1) of the cylindrical element 500 described above, a line connecting the two rotatable sections 530(1) intersects a central axis 520c of hinge 521 at a right angle. So, portion 524 and hinge portion 522(1) are rotatable about this line.

Figure 5C:
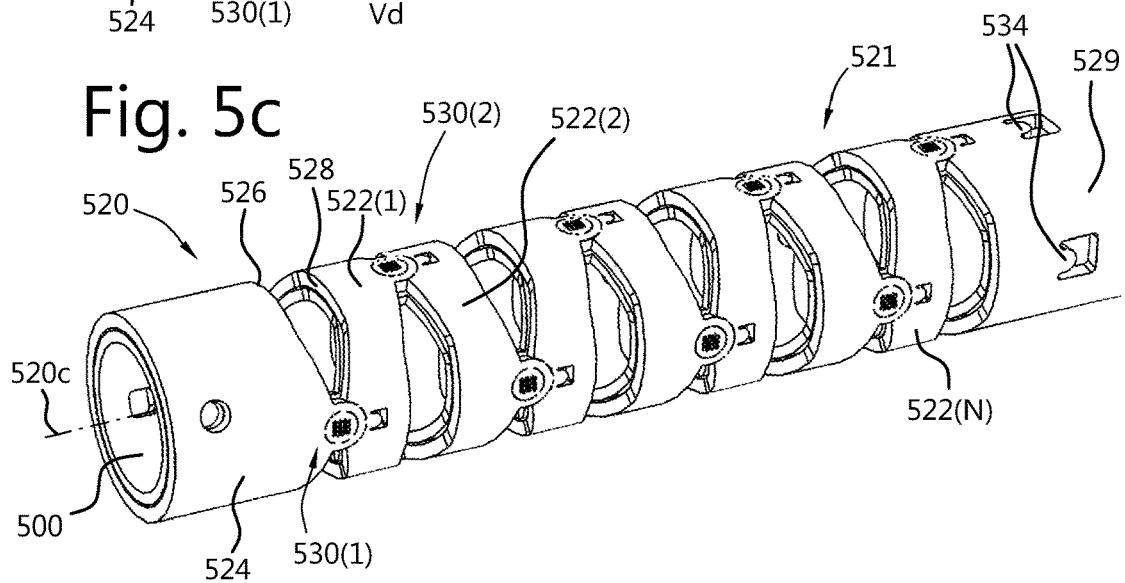
Figure 5D:
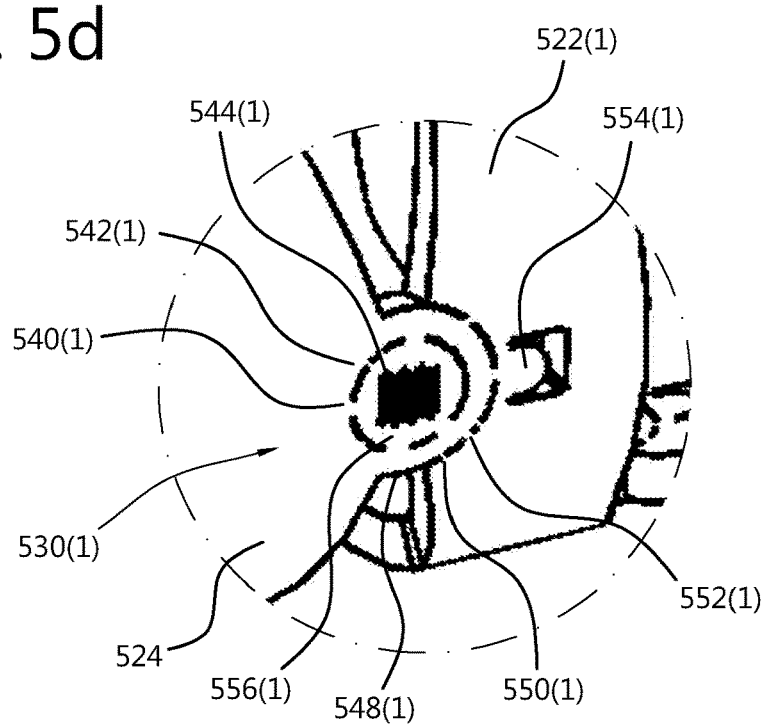

As shown in FIG. 5d, rotatable section 530(1) comprises an extension 548(1) provided with a circular shaped outer edge. This extension 548(1) may also be referred to as a first rotation section portion. This circular shaped extension 548(1) is accommodated in a circular shaped notch 550(1) of hinge portion 522(1). The circular shaped notch may also be referred to as second rotation portion, or may form part of a second rotation section portion, the second rotation section portion including an area of the hinge portion 522(1) facing the portion 524. The radius of circular shaped extension 548(1) and the radius of circular shaped notch 550(1) are the same. They have the same center of rotation. The circular shaped extension 548(1) and the circular shaped notch 550(1) are separated by a small slot made by a cutting operation, e.g. laser or water cutting or any other suitable cutting technique. During production of the slot, the slot is interrupted at predetermined locations such that extension 548(1) and notch 550(1) are still attached to each other by means of one or more small bridges 552(1). These bridges 552(1) operate as "fracture elements" as defined above. I.e., they will break once a force above a certain threshold is applied to them. Here they are designed such that they will break once portion 524 and hinge portion 522(1) are rotated relative to one another about the two extensions 548(1) with at least such a threshold force. The threshold force is selected such that the bridges 552(1) will break before either one of portion 524 or hinge portion 522(1) will deform beyond its maximum elasticity due the exerted rotation force. As will be explained hereinafter, they are only broken later during the manufacturing process.

Extension 548(1) is provided with a circular slot 542(1) about its center of rotation. The radius of slot 542(1) is smaller than the radius of circular shaped extension 548(1) itself. Inside slot 542(1) a circular shaped island 556(1) remains. As will become clear later herein below, this island 556(1) forms an element which may also be referred to as a pin or rotatable disc within the hinge. Thus, in the context of the present invention, a pin is defined as an element that is inserted in an opening of another element which other element can rotate about that pin. During manufacturing of slot 542(1), slot 542(1) is interrupted by small bridges 540(1) by means of which circular shaped island 556(1) is still attached to the rest of extension 548(1). These bridges 540(1) operate as "fracture elements" as defined above. I.e., they will break once a force above a certain threshold is applied to them. Here they are designed such that they will break once circular island 556(1) and extension 548(1) are rotated relative to one another with at least such a threshold force. The threshold force is selected such that the bridges 540(1) will break before either one of extension 548(1) or circular island 556(1) will deform beyond its maximum elasticity due the exerted rotation force. As will be explained hereinafter, they are only broken later during the manufacturing process.

Reference number 544(1) refers to an attachment structure in circular island 556(1). The attachment structure 544(1) is arranged such that circular island 556(1) can be attached to circular shaped extension 506(1) of cylindrical element 500 once cylindrical element 500 is inserted into cylindrical element 520. Such an attachment can be made by any suitable attachment technique including gluing, soldering, welding and laser welding. To assist laser welding, attachment structure 544(1) may be formed as a small slotted structure, e.g. in the form of a S made by laser cutting or water cutting.

Hinge portion 522(1) may be provided with one or more lips 554(1) (one shown in FIGS. 5b and 5d). Such a lip 554(1) may be located adjacent to rotatable section 530(1) at, substantially, the same tangential location as circular island 556(1). The lips 554(1) are used to attach hinge portion 522(1) of cylindrical tube 520 to hinge portion 502(1) of cylindrical element 500, e.g., by welding or laser welding once cylindrical element 500 is inserted into cylindrical element 520.

Referring again to FIG. 5b, hinge portion 522(1) and hinge portion 522(2) are arranged such that they can rotate relative to one another about two rotatable sections 530(2) (only one shown in FIG. 5b) located 180° rotated relative to one another as viewed in the tangential direction of cylindrical element 520. The structure of rotatable sections 530 (2) is, preferably, identical to rotatable section 530(1). So, rotatable section 530(2) has, preferably, the same elements as rotatable section 530(1) as shown in FIG. 5d, in which all indices (1) are replaced by (2). Rotatable sections 530(2) are located at locations 90° rotated relative to the locations of rotatable sections 530(1) as viewed in the tangential direction of cylindrical element 520.

Defined in more general terms, the rotation mechanism between two adjacent hinge portions 522($n$) and 522($n$+1) is as follows. Hinge portion 522($n$) and hinge portion 522($n$+1) are arranged such that they can rotate relative to one another about two rotatable sections 530($n$+1) located 180° rotated relative to one another as viewed in the tangential direction of cylindrical element 520. The structure of rotatable sections 530($n$+1) is, preferably, identical to rotatable section 530(1). So, rotatable section 530($n$+1) has the same elements as rotatable section 530(1) as shown in FIG. 5d, in which all indices (1) are replaced by (n+1). Rotatable sections 530($n$+1) are located at locations 90° rotated relative to the locations of rotatable sections 530($n$) and 530($n$+ 2) as viewed in the tangential direction of cylindrical element 520. Also rotatable sections 530($n$) and 530($n$+2) are, preferably, identical to rotatable section 530(1).

Portion 524 is provided with an outer edge 526 facing an outer edge 528 of hinge portion 522(1). Outer edge 526 and outer edge 528 define an open space between them such that, once the bridges 552(1) are broken, portion 524 and hinge portion 522(1) can freely rotate relative to one another about extensions 548(1) until a predetermined bending angle which is reached when outer edges 526 and 528 touch one another.

Outer edges 526 and 528 result from cutting, e.g. laser cutting or water cutting a predetermined pattern through cylindrical element 520. All adjacent hinge portions 522($n$), 522($n$+1) have open spaces between them like the spaces as defined between portion 524 and hinge portion 522(1) resulting from cutting, e.g. laser cutting or water cutting. These spaces are alternately rotated 90° viewed in the tangential direction of cylindrical element 520.

Because successive rotatable sections 530($n$) and 530($n$+ 1) are rotated about 90° relative to one another as viewed in the tangential direction of cylindrical element 520, hinge portion 522($n$−1) and hinge portion 522($n$) rotate relative to each other in a first direction perpendicular to a second direction of rotation of hinge portion 522($n$) relative to hinge portion 522($n$+2). As shown, the directions of rotation between successive hinge portions alternate between said first and second directions causing the hinge 521 to be flexible in all directions.

In an example, each notch 550($n$) is still attached to extension 548($n$) by means of bridges 552($n$) once a slot is made between them. So, after the cylindrical element structure 520 of FIG. 5b is made, in such an example, all different portions are still attached to each other and the structure will not fall apart in separate pieces. Moreover, after making cylindrical element 520 also all circular islands 556($n$) are still attached to the surrounding circular extension 548($n$) by means of bridges 540($n$). Therefore, once ready, the cylindrical element structure 520 of FIG. 5b is still an integral unit once cylindrical element 500 is ready to be inserted into cylindrical element structure 520. Moreover, before being inserted into one another both cylindrical elements 500, 520 still have a straight structure because of all bridges 510($n$), 552($n$) making the action of inserting the two cylindrical elements 500, 520 into one another easy.

Bridges 552(1) and 540(1) are designed as "fracture elements" as described herein above. I.e., they will break once a predetermined force is applied to them which is lower than a force necessary to deform the surrounding material beyond its maximum elasticity.

FIG. 5c shows the resulting hinge structure once cylindrical elements 500, 520 are inserted into each other. As shown, in the assembled state, cylindrical elements 500, 520 are both longitudinally and tangentially aligned with one another such that each rotatable section 530($n$) of cylindrical element 520 is aligned with one rotatable section 507($n$) of cylindrical element 500. In order to finalize the assembling, once cylindrical element 500 is inserted into cylindrical element 520, each attachment structure 544($n$) is attached to one circular extension 506($n$), e.g., by gluing, soldering, welding or laser welding. Optionally, also one or more hinge portions 522($n$) are attached to hinge portions 502($n$), e.g., by gluing, soldering, welding, or laser welding lips 554($n$) to hinge portion 502($n$). This latter action provides more rigidity to the total hinge structure.

Portion 529 can be attached to portion 509 in a similar way, e.g., by gluing, soldering, welding, or laser welding lips 534 to portion 509, or in any other suitable way. Similarly, portions 524 and 524 can be attached to one another.

Once cylindrical elements 500 and 520 are attached to one another in this way, a user can exert a rotation force in directions as indicated with double arrows 503 in FIG. 5a. By having the rotation force exceeding a certain threshold value all "fracture elements 510($n$), 540($n$) and 552($n$) will break. Consequently, portions 504/524 can freely rotate relative to adjacent hinge portions 502(1)/522(1) about pin 556(1), and hinge portions 502($n$)/522($n$) can freely rotate relative to adjacent hinge portions 502($n$+1)/522($n$+1) about pin 556($n$+1). Equally, portions 509/529 can freely rotate relative to hinge portions 502(N)/522(N).

Moreover, each circular shaped island 556($n$) is firmly attached to a circular extension 506($n$) in cylindrical element 500 and can freely rotate together with it within extension

548(*n*) in cylindrical element 520. By this structure, circular shaped island 556(*n*) acts as a pin, or spindle, having two functions. First, it acts as an pin of rotation about which extension 548(*n*) rotates. Second, because the slot between pin 556(*n*) and extension 548(*n*) can be very narrow, pin 556(*n*) acts to keep hinge portions 502(*n*)/522(*n*) and adjacent hinge portions 502(*n*+1)/522(*n*+1) in a well-defined position relative to one another with little play between them. The same is true for the position of portions 504/524 relative to hinge portions 502(1)/522(1) and hinge portions 502(N)/522(N) relative to portions 509/529.

Figure 6:
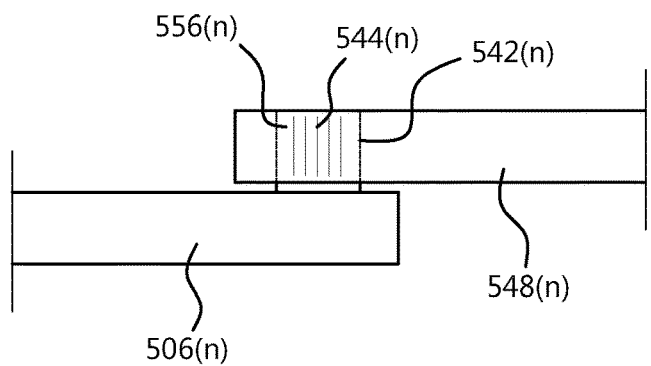
FIG. 6 shows a schematic cross section through a portion of a hinge structure according to an example.

FIG. 6 shows a schematic cross section through extension 506(*n*) of cylindrical element 500, and how such an extension 506(*n*) is attached to pin 556(*n*) which is rotatably arranged in a hole in extension 548(*n*) in cylindrical element 520 as defined by slot 542(*n*). Pin 556(*n*) is attached to extension 506(*n*), e.g., by (laser) welding attachment structure 544(*n*) to extension 506(*n*). Since the structure is rotation symmetric, cylindrical element 500 has two such pins 556(*n*) at opposite sides of its axis of symmetry 500c (so at locations rotated by 180° viewed in the tangential direction) both accommodated in a hole defined by slot 542(*n*) in the extension 548(1) of cylindrical element 520. This provides for a solid structure where adjacent portions of the hinge structure can freely rotate relative to one another while being connected to each other. Note also that adjacent hinge portions 502(*n*)/522(*n*) and 502(*n*+1)/522(*n*+1) are not attached to one another anymore by any portion of material of either cylindrical element 500 or cylindrical element 520. So, there is no elastic deformation of any material which would develop a counter rotation force during rotation.

Figure 7:
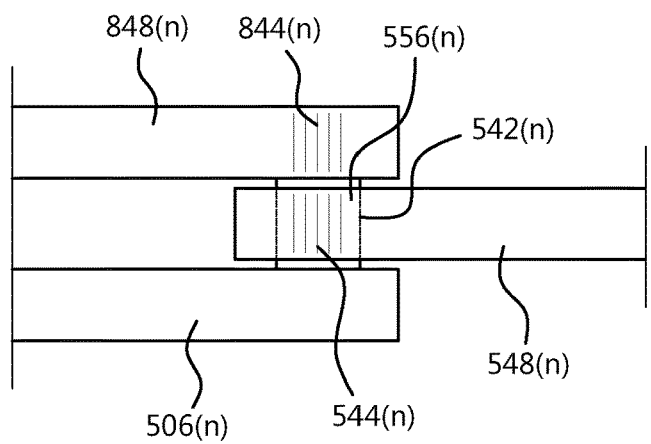
FIG. 7 shows a schematic cross section through a portion of a hinge structure according to a further example.
Figure 8A:
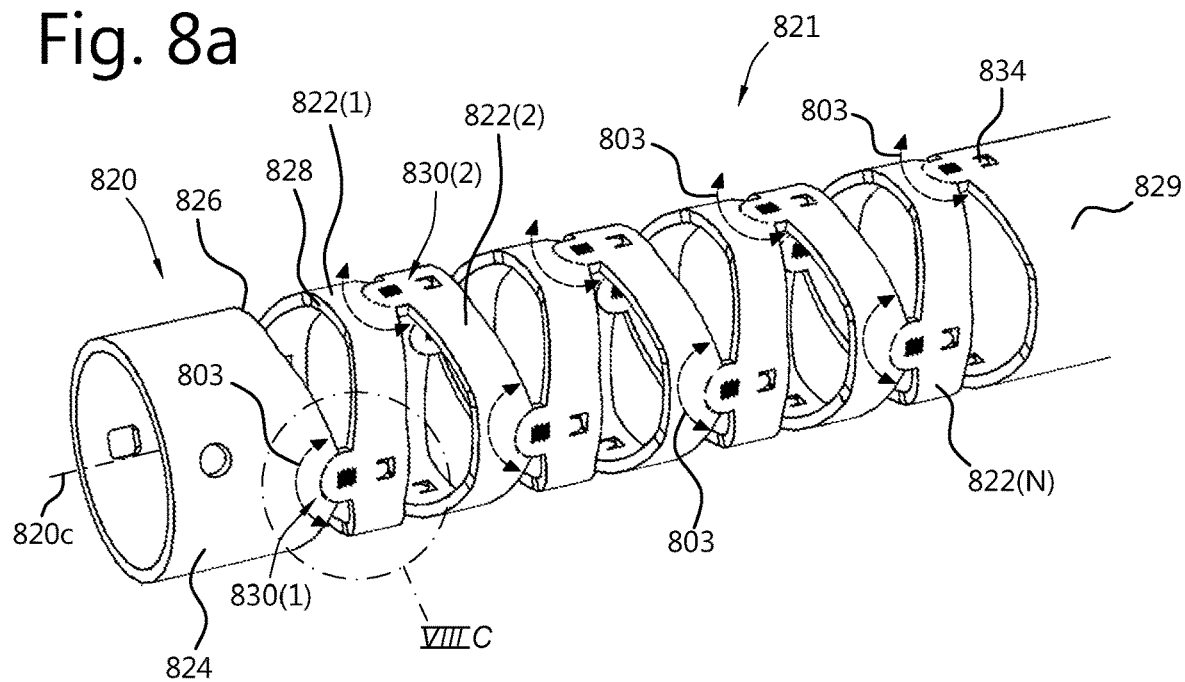
FIGS. 8a-8c show hinge structures in accordance with another embodiment of the invention.
Figure 8B:
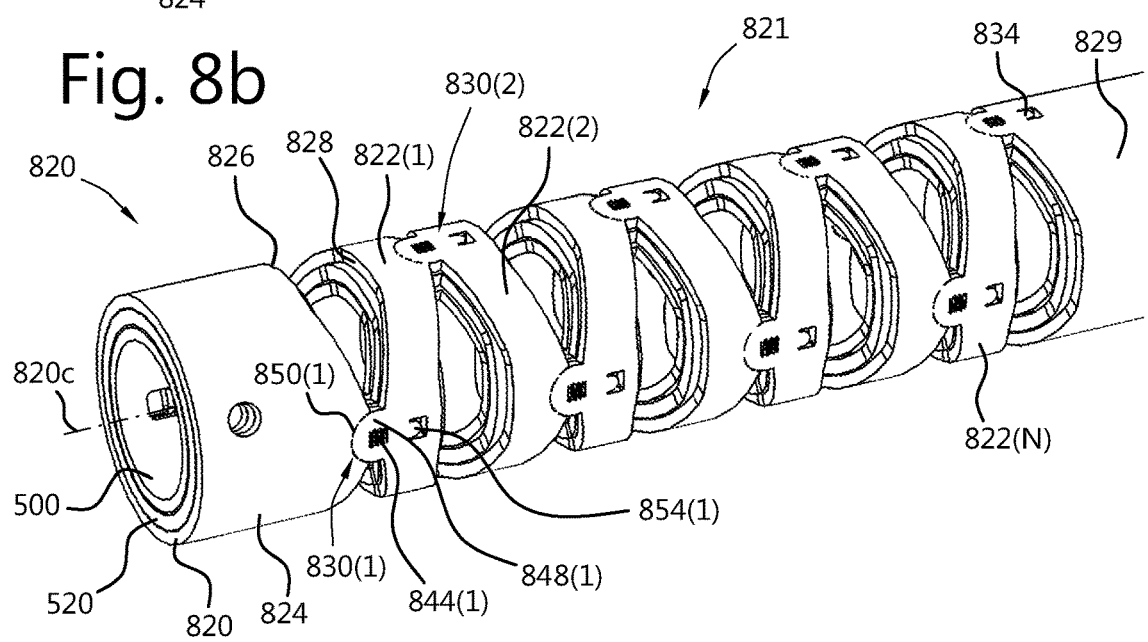

FIG. 7 shows that pin 556(*n*) can be further attached to an extension 848(*n*) of a cylindrical element 820 surrounding cylindrical element 520 as shown in FIGS. 8a and 8b. This can be done by gluing, soldering, welding, or laser welding extension 848(*n*) to pin 556(*n*) by an attachment structure 844(*n*).

FIG. 8a shows cylindrical element 820 in more detail.

FIG. 8a shows cylindrical element 820 with a hinge 821 made as a slotted structure. The cylindrical element 820 comprises a portion 824 and a further portion 829 opposite to portion 824. Hinge 821 is located in between them.

Hinge 821 comprises a plurality of hinge portions 822(1), 822(2), . . . 822(*n*), . . . , 822(N) (N being an integer number being larger than 1). In the shown example, each hinge portion 822(*n*) has an identical shape but that is not necessarily so. Each shown hinge portion 822(*n*) is a rigid ring shaped portion of cylindrical element 820.

Portion 824 and hinge portion 822(1) are arranged to be rotatable relative to one another by means of two rotatable sections 830(1) (only one visible in FIG. 8b) located 180° rotated relative to each other as seen in the tangential direction of cylindrical element 821. One such rotatable section 830(1) is shown in detail in FIG. 8c, as indicated with dotted circle Vd in FIG. 8b. A line connecting both rotatable sections 830(1) intersects a central axis of hinge 821. So, portion 824 and hinge portion 822(1) are rotatable about this line.

Figure 8C:
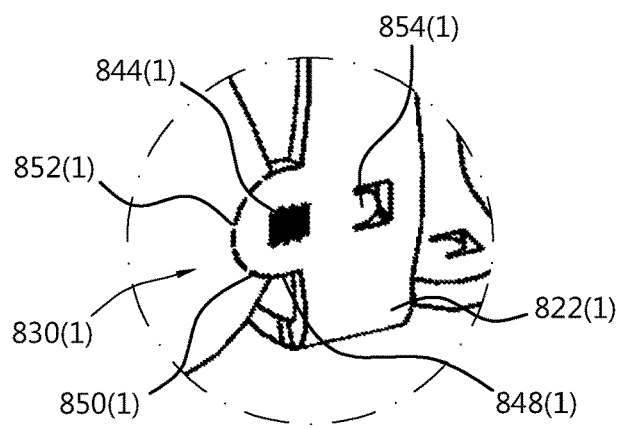

As shown in FIG. 8c, rotatable section 830(1) comprises an extension 848(1) provided with a circular shaped outer edge. This circular shaped extension 848(1) is accommodated in a circular shaped notch 850(1) of hinge portion 822(1). The radius of circular shaped extension 848(1) and the radius of circular shaped notch 850(1) are the same. They have the same center of rotation. The circular shaped extension 848(1) and the circular shaped notch 850(1) are separated by a small slot made by a cutting operation, e.g. laser or water cutting or any other suitable cutting technique. During production of the slot, the slot is interrupted at predetermined locations such that extension 848(1) and notch 850(1) are still attached to each other by means of one or more small bridges 852(1). These bridges 852(1) operate as "fracture elements" as defined above. I.e., they will break once a force above a certain threshold is applied to them. Here they are designed such that they will break once portion 824 and hinge portion 822(1) are rotated relative to one another about the two extensions 848(1) with at least such a threshold force. The threshold force is selected such that the bridges 852(1) will break before either one of portion 824 or hinge portion 822(1) will deform beyond its maximum elasticity due the exerted rotation force. As will be explained hereinafter, they are only broken later during the manufacturing process.

Reference number 844(1) refers to an attachment structure in circular extension 848(1). The attachment structure 844(1) is arranged such that circular extension 848(1) can be attached to pin 556(1) of cylindrical element 520 once cylindrical element 520 is inserted into cylindrical element 820. Such an attachment can be made by any suitable attachment technique including gluing, soldering, welding and laser welding. To assist laser welding, attachment structure 844(1) may be formed as a small slotted structure, e.g. in the form of a S made by laser cutting or water cutting.

Hinge portion 822(1) may be provided with one or more lips 854(1) (one shown in FIGS. 8b and 8c). Such a lip 854(1) may be located adjacent to lip 554(1) of cylindrical element 520 (cf. FIG. 5d). The lips 854(1) are used to attach hinge portion 822(1) of cylindrical tube 820 to hinge portion 522(1) of cylindrical element 520, e.g., by welding or laser welding once cylindrical element 520 is inserted into cylindrical element 820. By doing so, hinge portions 502(1), 522(1), and 822(1) will be firmly attached to one another.

Note that extension 506(1) of cylindrical element 500 is oriented in the same longitudinal direction as extension 848(1) of cylindrical element 820 whereas both these extensions are oriented in opposite longitudinal direction as extension 548(1) of cylindrical element 520. Thus, extension 548(1) can rotate between extensions 506(1) and 848(1) about pin 556(1) which pin 556(1) is attached at one end to extension 506(1) and at its opposing end to extension 848(1).

Referring again to FIG. 8a, hinge portion 822(1) and hinge portion 822(2) are arranged such that they can rotate relative to one another about two rotatable sections 830(2) (only one shown in FIG. 8a) located 180° rotated relative to one another as viewed in the tangential direction of cylindrical element 820. The structure of rotatable sections 830(2) is, preferably, identical to rotatable section 830(1). So, rotatable section 830(2) has, preferably, the same elements as rotatable section 830(1) as shown in FIG. 8c, in which all indices (1) are replaced by (2). Rotatable sections 830(2) are located at locations 90° rotated relative to the locations of rotatable sections 830(1) as viewed in the tangential direction of cylindrical element 820.

Defined in more general terms, the rotation mechanism between two adjacent hinge portions 822(*n*) and 822(*n*+1) is as follows. Hinge portion 822(*n*) and hinge portion 822(*n*+1) are arranged such that they can rotate relative to one another about two rotatable sections 830(*n*+1) located 180° rotated relative to one another as viewed in the tangential direction of cylindrical element 820. The structure of rotatable sections 830(*n*+1) is, preferably, identical to rotatable section 830(1). So, rotatable section 830(*n*+1) has the same elements as rotatable section 830(1) as shown in FIG. 8c, in which all indices (1) are replaced by (n+1). Rotatable sections 830(n+1) are located at locations 90° rotated relative to the locations of rotatable sections 830(n) and 830(n+2) as viewed in the tangential direction of cylindrical element 820. Also rotatable sections 830(n) and 830(n+2) are, preferably, identical to rotatable section 830(1).

Portion 824 is provided with an outer edge 826 facing an outer edge 828 of hinge portion 822(1). Outer edge 826 and outer edge 828 define an open space between them such that, once the bridges 852(1) are broken, portion 824 and hinge portion 822(1) can freely rotate relative to one another about extensions 848(1) until a predetermined bending angle which is reached when outer edges 826 and 828 touch one another.

Outer edges 826 and 828 result from cutting, e.g. laser cutting or water cutting a predetermined pattern through cylindrical element 820. All adjacent hinge portions 822(n), 822(n+1) have open spaces between them like the spaces as defined between portion 824 and hinge portion 822(1) resulting from cutting, e.g. laser cutting or water cutting. These spaces are alternately rotated 90° viewed in the tangential direction of cylindrical element 820.

Because successive rotatable sections 830(n) and 830(n+1) are rotated about 90° relative to one another as viewed in the tangential direction of cylindrical element 820, hinge portion 822(n−1) and hinge portion 822(n) rotate relative to each other in a first direction perpendicular to a second direction of rotation of hinge portion 822(n) relative to hinge portion 822(n+2). As shown, the directions of rotation between successive hinge portions alternate between said first and second directions causing the hinge 821 to be flexible in all directions.

In an example, each notch 850(n) is still attached to extension 848(n) by means of bridges 852(n) once a slot is made between them. So, after the cylindrical element structure 820 of FIG. 8b is made, in such an example, all different portions are still attached to each other and the structure will not fall apart in separate pieces. Therefore, once ready, the cylindrical element structure 820 of FIG. 8a is still an integral unit once cylindrical element 520 is ready to be inserted into cylindrical element structure 820. Moreover, before being inserted into one another both cylindrical elements 520, 820 still have a straight structure because of all bridges 552(n), 852(n) making the action of inserting the two cylindrical elements 520, 820 into one another easy.

Bridges 852(1) and 840(1) are designed as "fracture elements" as defined herein above. I.e., they will break once a predetermined force is applied to them which is lower than a force necessary to deform the surrounding material beyond its maximum elasticity.

FIG. 8b shows the resulting hinge structure once cylindrical elements 500, 520, and 820 are inserted into each other. As shown, in the assembled state, cylindrical elements 500, 520, 820 are longitudinally and tangentially aligned with one another such that each rotatable section 530(n) of cylindrical element 520 is aligned with both one rotatable section 507(n) of cylindrical element 500 as well as with one rotatable section 830(n) of cylindrical element 820. In order to finalize the assembling, once cylindrical element 500 is inserted into cylindrical element 520, each pin 556(n), e.g., by attachment structure 544(n), is attached to one circular extension 506(n), e.g., by gluing, soldering, welding or laser welding. Once, after that, cylindrical element 520, together with cylindrical element 500, is inserted into cylindrical element 820, and each extension 848(n), e.g., by attachment structure 844(n), is attached to pin 556(n), e.g., by gluing, soldering, welding or laser welding.

Optionally, also one or more hinge portions 822(n) are attached to hinge portions 522(n), e.g., by gluing, soldering, welding, and/or laser welding lips 854(n) to lips 554(n). This latter action provides more rigidity to the total hinge structure.

Portion 829 can be attached to portion 809 in a similar way, e.g., by gluing, soldering, welding, or laser welding lips 834 to portion 809, or in any other suitable way. Similarly, portions 824 and 824 can be attached to one another.

Once cylindrical elements 500, 520 and 820 are attached to one another in this way, a user can exert a rotation force in directions as indicated with double arrows 803 in FIG. 8a. By having the rotation force exceeding a certain threshold value all "fracture elements" 510(n), 540(n), 552(n) and 852(n) will break. Consequently, portions 504/524/824 can freely rotate relative to adjacent hinge portions 502(1)/522(1)/822(1) about pins 556(1), and hinge portions 502(n)/522(n)/822(n) can freely rotate relative to adjacent hinge portions 502(n+1)/522(n+1)/822(n+1) about pins 556(n+1). Equally, portions 509/529/829 can freely rotate relative to hinge portions 502(N)/522(N)/822(N).

Moreover, each circular shaped island 856(n) is firmly attached to a circular extension 806(n) in cylindrical element 800 and can freely rotate together with it within extension 848(n) in cylindrical element 820. By this structure, circular shaped island 856(n) acts as a pin, or spindle, having two functions. First, it acts as an pin of rotation about which extension 848(n) rotates. Second, because the slot between pin 856(n) and extension 848(n) can be very narrow, pin 856(n) acts to keep hinge portions 802(n)/522(n) and adjacent hinge portions 802(n+1)/522(n+1) in a well-defined position relative to one another with little play between them. The same is true for the position of portions 804/524 relative to hinge portions 802(1)/522(1) and hinge portions 802(N)/522(N) relative to portions 809/529.

Figure 9A:
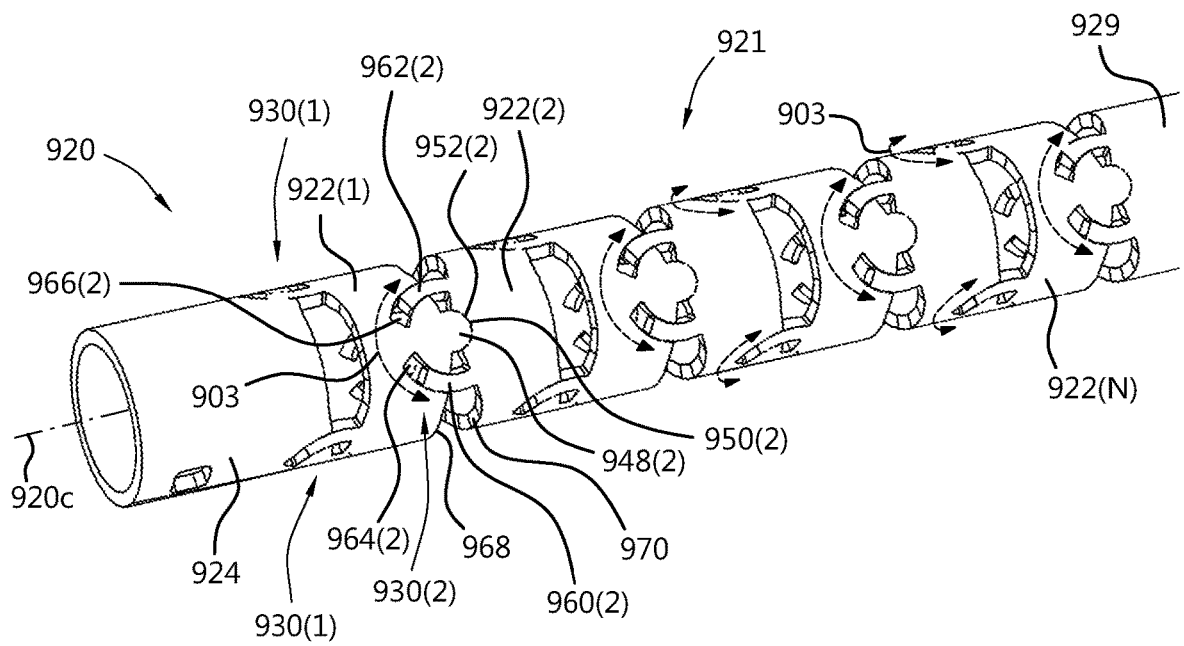
FIGS. 9a-9c show hinge structures in accordance with another embodiment of the invention.
Figure 9B:
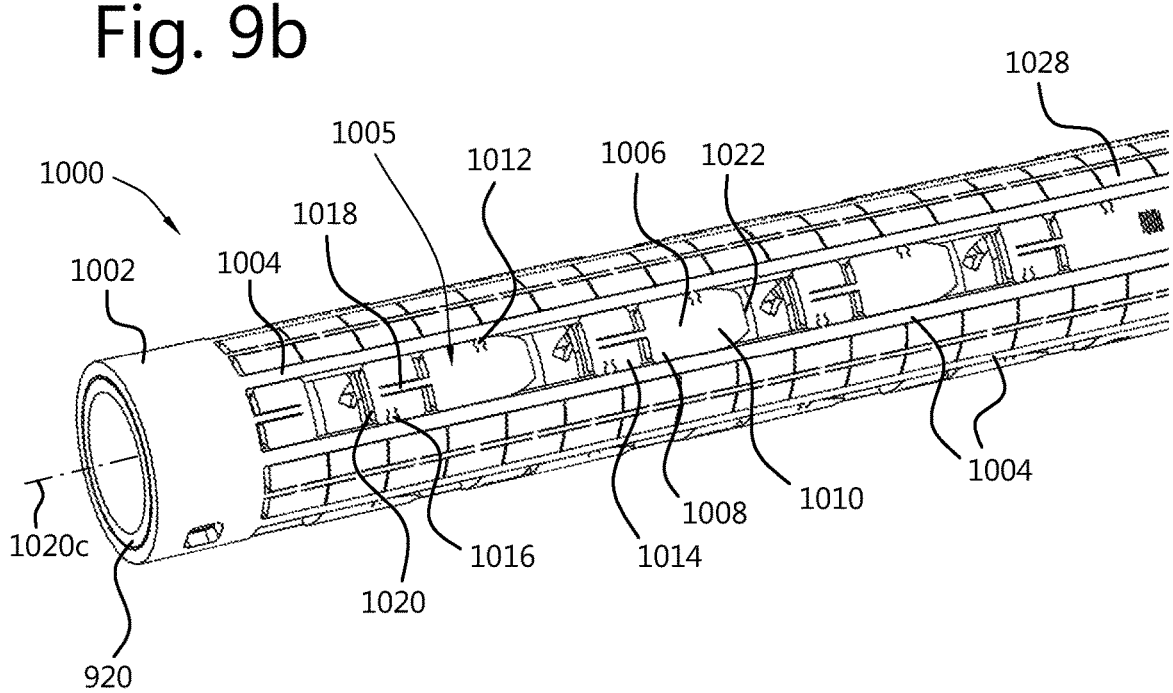
Figure 9C:
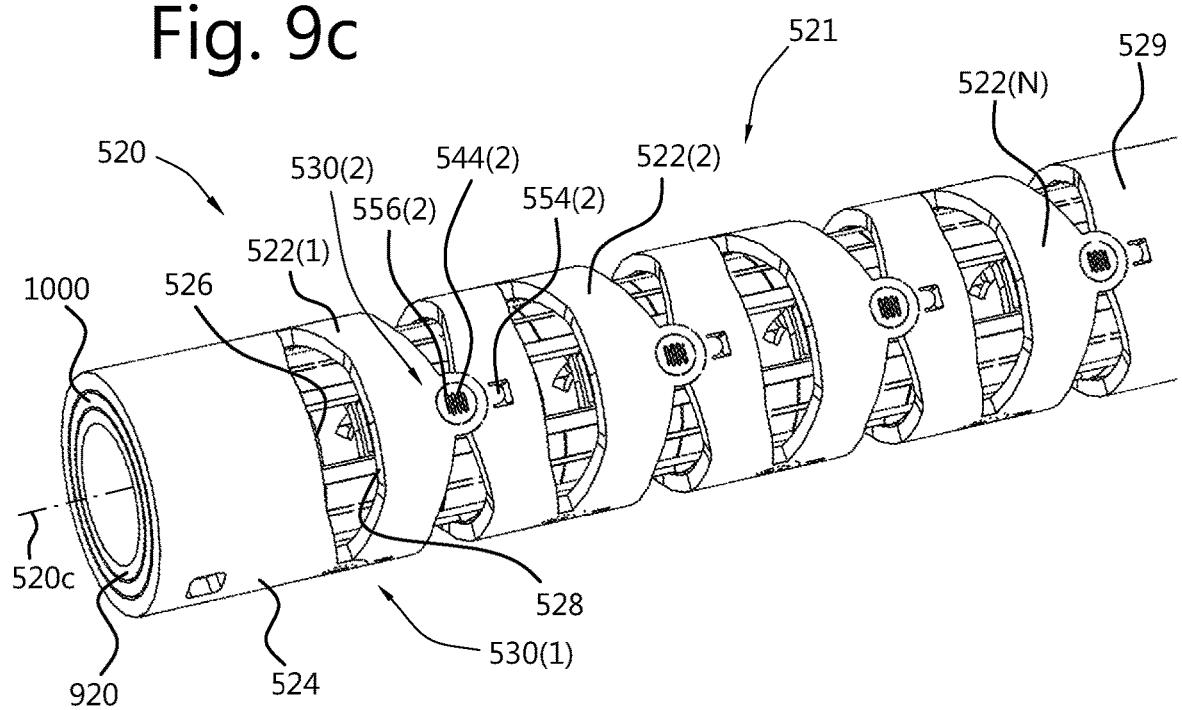

FIGS. 9a, 9b and 9c show an embodiment of the hinge structure of the present invention as applied in a steerable instrument having longitudinal elements cut from a cylindrical element and arranged as steering strips for the instrument. Such a steerable instrument may be based on any one of the instruments shown with reference to FIGS. 1-4. Below, the application of the hinge structure of the present invention will be explained with reference to a steerable instrument with steering strips in one cylindrical element. However, the invention can be applied in any steerable instrument with one or more cylindrical elements with steering strips cut from the cylindrical elements.

FIG. 9a show an inner cylindrical element, whereas FIG. 9b shows an intermediate cylindrical element with such steering strips having the inner cylindrical element inserted into it. FIG. 9c shows an outer cylindrical element into which a set of the inner cylindrical element and the intermediate cylindrical element are inserted.

FIG. 9a shows an example of a tip of an inner cylindrical element 920 which may be at the distal end or proximal end of the instrument. For the present explanation it will be assumed to be located at the distal end but an equal arrangement may be located at the proximal end. Alternatively, the steering strips may be steered by means of a ball shaped member or a motor of a robotic steering mechanism. As explained above, the tip of the instrument is steerable. The inner cylindrical element may be entirely flexible and may be made of any suitable material including any type of plastic or metal that can be used in a medical environment. The structure of FIG. 9a is but one example of a possible embodiment in which flexibility is provided by means of a slotted hinge structure 921.

The slotted hinge structure 921 is arranged proximally from a ring shaped end portion 924 of cylindrical element 920. Slotted hinge structure 921 comprises a plurality of hinge portions 922(1), 922(2), . . . , 922(n), 922(N). End portion 924 is rotatably arranged relative to hinge portion 922(1) and hinge portion 922(N) is rotatably arranged relative to a cylindrical element portion 929 arranged proximally from hinge structure 921.

End portion 924 can rotate relative to hinge portion 922(1) about two rotation sections 930(1) located 180° rotated relative to one another as viewed in the tangential direction of cylindrical element 920. I.e., a line connecting the two rotation sections 930(1) intersects an axis of symmetry of cylindrical element 920. When end portion 924 rotates relative to hinge portion 922(1) the rotation is about this line.

Between each adjacent two hinge portions 922(n) and 922(n+1) two rotation sections 930(n+1) are present such that they can rotate relative to one another about a line connecting these two rotation sections 930(n+1). In an embodiment, all rotation sections 930(n) are identical but that is not strictly necessary.

An example of such a rotation section 930(n) is provided with reference to rotation section 930(2). Rotation section 930(2) is located between hinge portions 922(1) and 922(2). At a location 180° rotated relative to the location of rotation section 930(2) there is second rotation section 930(2). Rotation section 930(2) comprises a circular extension 948(2) of hinge portion 922(1). Extension 948(2) is accommodated in a circular notch 950(2) in hinge portion 922(2). Extension 948(2) and notch 950(2) are separated by a slot cut through cylindrical element 920. During cutting, e.g. by laser cutting or water cutting, and producing the slot, extension 948(2) and notch 950(2) remain attached to each other by means of small bridges 952(2) which act as "fracture elements" as explained above. I.e., they are designed such that they will break when hinge portions 922(1) and 922(2) are rotated relative to one another with a predetermined force above a certain threshold force which is below a force required to deform the surrounding material of hinge portions 922(1) and 922(2) beyond their maximum elasticity.

A center point of extension 948(2) defines a point of rotation about which hinge portions 922(1) and 922(2) will be rotatable once the bridges 952(2) are broken.

Rotation section 930(2) also comprises two lip elements 960(2), 962(2) extending from hinge portion 922(2) towards hinge portion 922(1). Both lip elements 960(2) and 962(2) have a circular shape and are located at a radial distance from the point of rotation which is larger than the radius of circular extension 948(2). Lip element 960(2) can be moved in a circular direction in a circular shaped slot 964(2) arranged in hinge portion 922(1). Lip element 962(2) can be moved in a circular direction in a circular shaped slot 966(2) arranged in hinge portion 922(1).

The lip elements 960(2), 962(2), as well as the circular slots 964(2), 966(2) can be formed by cutting, e.g. by laser cutting or water cutting, a predetermined pattern through cylindrical element 920, as will be evident to a person skilled in the art. During that cutting process, lip elements 960(2) and 962(2) may remain attached to surrounding material from hinge portion 922(1) by means of small bridges acting as "fracture elements" as explained above.

Lip elements 960(2) and 962(2) accommodate a portion of hinge portion 922(1) including circular extension 948(2) such that hinge portions 922(1) and 922(2) cannot easily move relative to one another in the longitudinal direction of the cylindrical element 920.

Hinge portion 922(1) has an edge 968 facing an edge 970 of hinge portion 922(2) which are shaped such that they define a predetermined open space between hinge portions 922(1) and 922(2). This open space as well as the length of the slots 964(2), 966(2) determine an angel about which hinge portions 922(1) and 922(2) can rotate relative to one another.

Note that when one rotates hinge portions 922(1), 922(2) relative to one another with a predetermined force above a predetermined threshold value in a direction indicated with double arrow 903, fracture elements 952(2) (as well as possible fracture elements attaching lip elements 960(2), 962(2) to adjacent material of hinge portion 922(1)) will break, such that hinge portions 922(1) and 922(2) are no longer attached to each other and can freely rotate. This, however, is preferably not done prior to inserting inner cylindrical element 920 into intermediate cylindrical element 1020 shown in FIG. 9b.

Again, consecutive rotation sections 930(n) and 930(n+1) are 90° rotated in the tangential direction of cylindrical element 920 to provide hinge structure 921 with complete flexibility in all directions.

FIG. 9b shows an example of intermediate cylindrical element 1000. Intermediate cylindrical element 1000 comprises a ring shaped distal end portion 1002 which is attached to a plurality of steering strips 1004, here made by cutting, e.g. by laser cutting or water cutting, longitudinal elements from cylindrical element 1000. When one desires bendability in one (and the opposite) direction two such steering strips 1004 are sufficient. However, if one wishes bendability in all directions at least three steering strips 1004 should be applied. The steering strips 1004 are, in an example, located at tangentially equidistant locations. In the present example, 8 such steering strips 1004 are applied.

As shown in FIG. 9b, two adjacent steering strips 1004 are protected from tangential movements relative to one another by tangential spacers. Two different sets of tangential spacers are shown. A first set comprises spacers 1028 formed as a longitudinal strip with spacer elements at both sides tangentially extending to such an extent that they touch adjacent steering strips 1004. These spacer elements may have any desired form, i.e., flexible plate like elements, M-shaped elements, S-shaped elements, pin-shaped elements, or any other suitable form known to persons skilled in the art. Spacers 1028 can, alternatively also be formed as flexible plate like elements, M-shaped elements, S-shaped elements, pin-shaped elements, or any other suitable form known to persons skilled in the art, which are directly attached to either one of two adjacent steering strips 1004 and extend to the other one of the two adjacent steering strips 1004, as is known from the prior art.

A second set of tangential spacers comprises a plurality of spacer elements 1005 consecutively arranged in the longitudinal direction between two adjacent steering strips 1004. The first set of spacers 1028 and the second set of spacers 1005 alternate in the tangential direction of cylindrical element 1000.

Each spacer element 1005 comprises a plate 1006 separated from adjacent steering strips 1004 by a slot resulting from cutting, e.g. laser cutting or water cutting, through cylindrical element 1000. During cutting, plate 1006 preferably remains attached to one or both adjacent steering strips 1004 by a "fracture element" 1012, which is a fracture element as described herein above. Fracture element 1012 is designed such that when a relative longitudinal force is applied between steering strip 1004 and plate 1006 to which fracture element 1012 is attached, fracture element 1012 will break once that force exceeds a certain threshold force. The threshold force should be selected such that the resulting forces in steering strip 1004 and plate 1006 remain below their maximum elasticity.

In the embodiment shown, plate 1006 is attached to a further plate 1014 which is separated from adjacent steering strips 1004 by a slot resulting from cutting, e.g. laser cutting or water cutting, through cylindrical element 1000. During cutting, plate 1014 preferably remains attached to one or both adjacent steering strips 1004 by a "fracture element" 1016. Fracture element 1016 is designed such that when a relative longitudinal force is applied between steering strip 1004 and plate 1014 to which fracture element 1016 is attached, fracture element 1016 will break once that force exceeds a certain threshold force. The threshold force should be selected such that the resulting forces in steering strip 1004 and plate 1014 remain below their maximum elasticity.

In an example, plate 1006 is attached to plate 1014 by means of a flexible attachment strip 1018 such that they are located at a predetermined longitudinal distance from each other. Attachment strip 1018 can, to that end, extend into plate 1014 (and/or into plate 1006), by having a slot at both sides as shown in FIG. 9b.

Plate 1014 has an edge 1020 facing towards the distal end and plate 1006 has an edge 1022 facing towards the proximal end. Consecutive spacer elements 1005 are longitudinally located at predetermined distances from one another as determined by a certain required flexibility of the instrument.

Once cylindrical elements 920 and 1000 are manufactured, both of them are integral cylindrical elements of which all different components are still attached to one another by means of fracture elements, as explained above. They are still straight and cylindrical element 920 can be inserted into cylindrical element 1000 easily. They are both longitudinally and tangentially aligned when inserted into each other. Then, in an embodiment, ends 924 and 1002 are attached to one another, e.g., by gluing, soldering, welding, laser welding, etc.

Once inserted into each other, a set of cylindrical elements 920, 1002 is inserted into a cylindrical element that may have an identical shape as cylindrical element 520 as explained with reference to FIGS. 5b and 5d. FIG. 9c shows a (e.g., distal) end structure of an instrument in which this has been done. The set of cylindrical elements 920, 1002 is both longitudinally and tangentially aligned with cylindrical element 520. The alignment is such that each pin 556(n) located inside hinge portion 522(n-1) is radially aligned with and attached to a portion 1008 of plate 1006. That may be done by means of attachment structure 544(n) if present. Attachment can be done by gluing, welding, laser welding etc. Moreover, a portion of hinge portion 522(n) located at a longitudinally shifted position from pin 556(n) is attached to plate 1006 at a portion 1010 located at the same longitudinally shifted position from portion 1008. This portion of hinge portion 522(n) may be lip 554(n). In this way, each pin 556(n) located inside hinge portion 522(n-1) is firmly attached to hinge portion 522(n) by one single plate 1006 which is located itself in intermediate cylindrical element 1000. Moreover, plates 1006 also function as tangential spacers between adjacent steering strips in intermediate cylindrical element 1000.

Preferably, end portion 524 is attached to end portion 1002 once longitudinal and tangential alignment have been done.

Once all three cylindrical elements 920, 1000, 520 are inserted into each other, are longitudinally and tangentially aligned as desired, and attached to one another as explained above, a user may bend the instrument by exerting rotation forces 903 (cf. FIG. 9a) in all directions with such a force that all fracture elements keeping distinct components still attached to each other will break and the surrounding material is not exposed to forces beyond their maximum elasticity. All rotation sections in inner cylindrical element 920 and outer cylindrical element 520 will then be able to rotate freely. The only counter force against any bending is then developed in intermediate cylindrical element 1000 because, then, several components will bend elastically.

Of course, a further outer cylindrical element may be applied in the instrument of FIGS. 9a, 9b, 9c, like cylindrical element 820 (FIG. 8a) to provide the total structure with more rigidity.

While the embodiment of FIGS. 9a, 9b, and 9c show plates 1006 inside rotation sections 530(n), the cylindrical elements 1000 and 520 may be designed such that cylindrical element 520 is inserted into cylindrical element 1000 and plates 1006 are located outside rotation section 530(n).

Figure 10A:
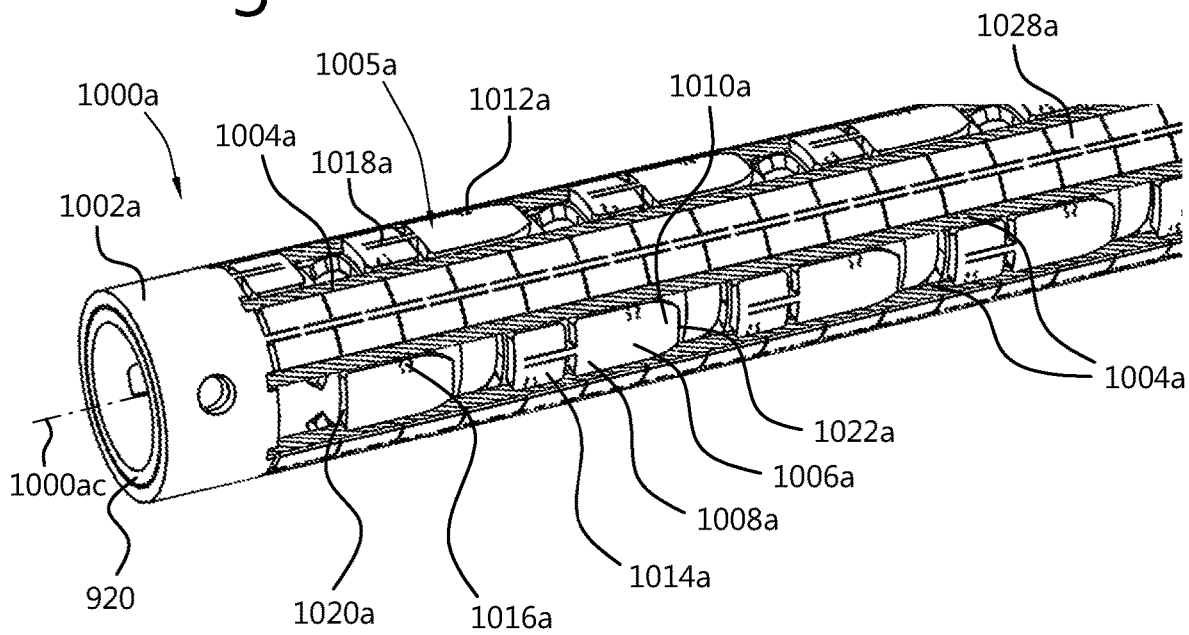
Figure 10B:
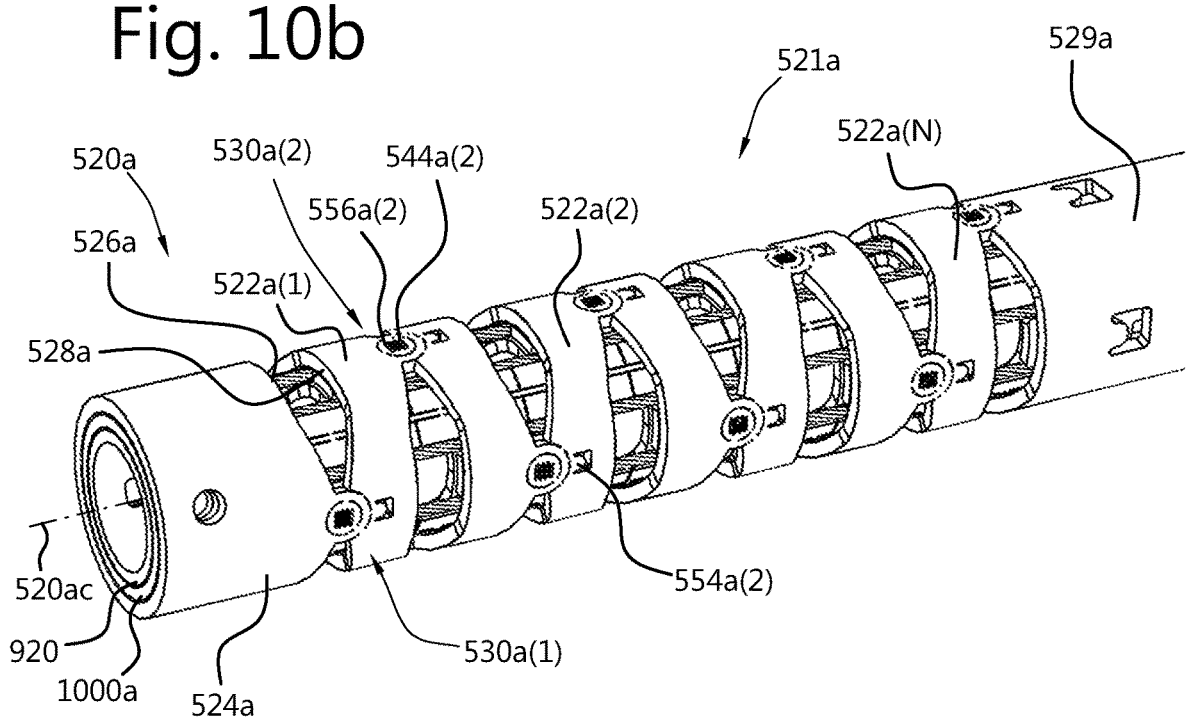

FIGS. 10a and 10b show an embodiment of the hinge structure of the present invention as applied in a steerable instrument having steering cables or wires acting as steering elements for the instrument. Such a steerable instrument may be based on any steerable instruments provided with steering cables as known from the prior art. For example, such steerable instrument may be based on any one of the embodiments described in non-prepublished PCT/NL2019/0506850.

FIG. 10a shows an intermediate cylindrical element 1000a, provided with steering cables 1004a, and assembled coaxially aligned with the inner cylindrical element 920 shown in FIG. 9a. FIG. 10b shows the inner cylindrical element 920 and the intermediate cylindrical element 1000a assembled, and longitudinally and tangentially aligned with, outer cylindrical element 520a. Note that outer cylindrical element 520a may be identical to outer cylindrical element 520 shown in FIG. 9c.

FIG. 10a shows an example of intermediate cylindrical element 1000a, which is substantially similar to intermediate cylindrical element 1000 of FIG. 9b, however comprising steering cables 1004a instead of steering strips 1004. In FIG. 10a, elements corresponding to elements of FIG. 9b are indicated by corresponding reference numbers, provided with the suffix "a". It should be understood that the features may advantageously be similar to the corresponding features described with reference to FIG. 9b, where applicable modified to facilitate the user of steering cables 1004a instead of steering strips 1004, as will be understood by the person skilled in the art. The explanation of the various features will therefore not be repeated herein below.

Intermediate cylindrical element 1000a comprises a ring shaped distal end portion 1002a which is attached to a plurality of steering cables 1004a. When one desires bendability in one (and the opposite) direction two such steering cables 1004a are sufficient. However, if one wishes bendability in all directions at least three steering cables 1004a should be applied. The steering cables 1004a are, in an example, located at tangentially equidistant locations.

As shown in FIG. 10a, two adjacent steering cables 1004a are protected from tangential movements relative to one another by tangential spacers. Two different sets of tangential spacers are shown. A first set comprises spacers 1028a formed as a longitudinal strip with spacer elements at both sides tangentially extending to such an extent that they touch adjacent steering cables 1004a.

A second set of tangential spacers comprises a plurality of spacer elements 1005a consecutively arranged in the longitudinal direction between two adjacent steering cables 1004a. The first set of spacers 1028a and the second set of spacers 1005a alternate in the tangential direction of cylindrical element 1000a.

Each spacer element 1005a comprises a plate 1006a separated from adjacent steering cables 1004a by a slot.

In the embodiment shown, plate 1006a is attached to a further plate 1014a which is separated from adjacent steering cables 1004a by a slot.

In an example, plate 1006a is attached to plate 1014a by means of a flexible attachment strip 1018a such that they are located at a predetermined longitudinal distance from each other.

Once cylindrical elements 920 and 1000a are manufactured, both of them are integral cylindrical elements of which all different components are still attached to one another by means of fracture elements, as explained above. They are still straight and cylindrical element 920 can be inserted into cylindrical element 1000a easily. They are both longitudinally and tangentially aligned when inserted into each other. Then, in an embodiment, ends 924 and 1002a are attached to one another, e.g., by gluing, soldering, welding, laser welding, etc.

Once inserted into each other, a set of cylindrical elements 920, 1000a is inserted into a cylindrical element that may have an identical shape as cylindrical element 520 as explained with reference to FIGS. 5b and 5d. FIG. 10b shows a (e.g., distal) end structure of an instrument in which this has been done. The set of cylindrical elements 920, 1000a is both longitudinally and tangentially aligned with cylindrical element 520. The alignment is such that each pin 556(n) located inside hinge portion 522(n-1) is radially aligned with and attached to a portion 1008a of plate 1006a. That may be done by means of attachment structure 544(n) if present. Attachment can be done by gluing, welding, laser welding etc. Moreover, a portion of hinge portion 522(n) located at a longitudinally shifted position from pin 556(n) is attached to plate 1006a at a portion 1010a located at the same longitudinally shifted position from portion 1008a. This portion of hinge portion 522(n) may be lip 554(n). In this way, each pin 556(n) located inside hinge portion 522(n-1) is firmly attached to hinge portion 522(n) by one single plate 1006 which is located itself in intermediate cylindrical element 1000a. Moreover, plates 1006a also function as tangential spacers between adjacent steering cables in intermediate cylindrical element 1000a.

Preferably, end portion 524 is attached to end portion 1002a once longitudinal and tangential alignment have been done.

Once all three cylindrical elements 920, 1000a, 520 are inserted into each other, are longitudinally and tangentially aligned as desired, and attached to one another as explained above, a user may bend the instrument by exerting rotation forces 903 (cf. FIG. 9a) in all directions with such a force that all fracture elements keeping distinct components still attached to each other will break and the surrounding material is not exposed to forces beyond their maximum elasticity. All rotation sections in inner cylindrical element 920 and outer cylindrical element 520 will then be able to rotate freely. The only counter force against any bending is then developed in intermediate cylindrical element 1000a because, then, several components will bend elastically.

Of course, a further outer cylindrical element may be applied in the instrument of FIGS. 10a, 10b, like cylindrical element 820 (FIG. 8a) to provide the total structure with more rigidity.

While the embodiment of FIGS. 10a and 10b show plates 1006a inside rotation sections 530(n), the cylindrical elements 1000a and 520 may be designed such that cylindrical element 520 is inserted into cylindrical element 1000a and plates 1006a are located outside rotation section 530(n).

The invention is not limited to the embodiments discussed so far. In the above explained embodiments, adjacent hinge portions 522(n), 522(n+1) of a cylindrical hinge 521 can rotate relative to one another because one of them is provided with two holes located opposite to one another viewed in the tangential direction. Each hole accommodates a pin 556(n) which is attached to an element 506(n), 1006 inside said cylindrical hinge 521 and/or to an element 848(n) outside said cylindrical element 521. That element 506(n), 1006 or 848(n) is also attached to a portion of the other hinge portion. Thus, the pin remains inside its corresponding hole and adjacent hinge portions remain at a well-defined distance from each other. They can freely rotate relative to one another about the pins 556(n).

However, the pins themselves need not be the centers of rotation as will be explained with reference to FIG. 11.

Figure 11:
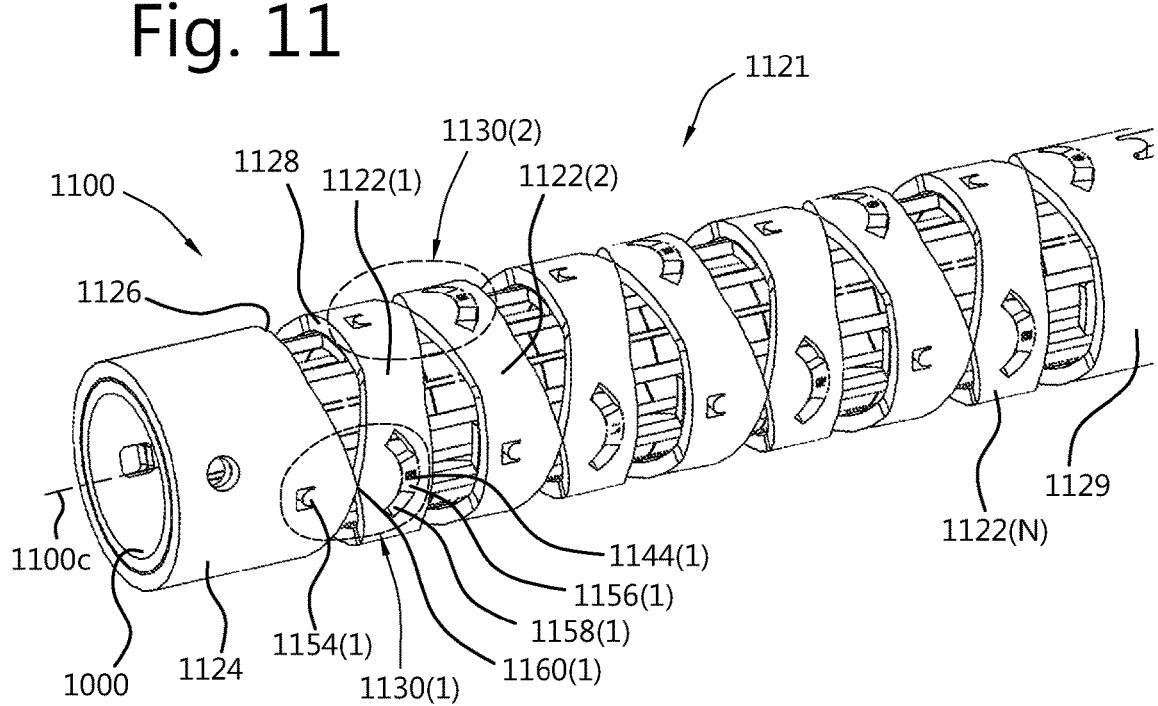
FIG. 11 shows hinge structures in accordance with another embodiment of the invention.

FIG. 11 shows an alternative to outer cylindrical element 520. FIG. 11 shows cylindrical element 1000 inserted into a cylindrical element 1100. Inside cylindrical element 1000 there may be any other suitable flexible cylindrical element as explained above with reference to cylindrical element 920. Also, again, there may be more cylindrical elements with steering strips to control bending of deflectable sections of the instrument. Alternatively, instead of cylindrical element 1000, cylindrical element 1000a may be inserted into a cylindrical element 1100, in a manner similar to the manner described herein below with reference to cylindrical element 1000.

Cylindrical element 1100 has an end portion 1124 which may be located at the distal end of the instrument. However, it may alternatively be a proximal end. Adjacent to end portion 1124, cylindrical element 1100 comprises a plurality of hinge portions 1122(1), 1122(2), . . . , 1122(n), . . . , 1122(N) of a (cylindrical) hinge 1121. End portion 1124 is rotatable relative to hinge portion 1122(1), like an end portion 1129 is rotatable relative to hinge portion 1122(N).

Each hinge portion 1122(n-1) is rotatable relative to an adjacent hinge portion 1122(n) by means of two rotatable sections 1130(n). End portion 1124 is rotatable relative to adjacent hinge portion 1122(1) by means of two rotatable sections 1130(1). Hinge portion 1122(N) is rotatable relative to end portion 1129 by means of two rotatable sections 1130(N+1). Each two rotation sections 1130(n) are located 180° rotated relative to one another viewed in the tangential direction.

Rotation section 1130(1) is shown in more detail. However, all other rotation sections 1130(n) are, preferably, formed in the same way.

End portion 1124 has an outer edge 1126 facing towards outer edge 1128 of hinge portion 1122(1). Outer edges 1126 and 1128 are designed such that they define an open space between end portion 1124 and hinge portion 1122(1). Edges 1126 and 1128 only touch one another at two predetermined locations 1160(1). During manufacturing these open spaces can be formed by cutting, e.g. laser cutting or water cutting, a predetermined pattern through cylindrical element 1100. At locations 1160(1) fracture elements may be applied to keep end portion 1124 and hinge portion 1122(1) still attached to each other as long as cylindrical element 1000 is not yet inserted into cylindrical element 1100. Locations 1160(1) will become centers of rotation.

Hinge portion 1122(1) is provided with a pin 1156(1) that can be moved inside a slot 1158(1) in hinge portion 1122(1). Slot 1158(1) is made by cutting, e.g., laser cutting or water cutting, through hinge portion 1122(1) while at the same time forming pin 1156(1). Pin 1156(1) is, thus, a disc resulting from cutting in hinge portion 1122(1). Slot 1158(1) has a circular shape positioned at an arc of a circle having a center co-located with the center of rotation 1160(1).

Once cylindrical element 1100 is ready, cylindrical element 1000 is inserted into cylindrical element 1100 and properly aligned both longitudinally and tangentially. Note that, in this embodiment, cylindrical element 1000 comprises spacer elements 1005 below all rotation sections 1130($n$), unlike in FIG. 24$b$ which shows a slightly different spacer structure below rotation center 1130(1). In the embodiment of FIG. 25, plate 1014 of spacer element 1005 below rotation section 1130(1) may be part of end portion 1002. Center of rotation 1160(1) is aligned such that it is radially aligned with a flexible portion of attachment strip 1018 between plate 1014 and plate 1006. Pin 1156(1) is attached to plate 1006, e.g., by gluing, welding, laser welding, or the like. Moreover, a portion of end portion 1124 adjacent to rotation center 1160(1) is attached to plate 1014, e.g., by gluing, welding, laser welding, or the like. This portion of end portion 1124 may be a lip 1130(1) cut in end portion 1124. In this way, pin 1156(1) is attached to end portion 1124 and yet properly held in place in slot 1158(1). Attachment strip 1018 prevents longitudinal displacement between end portion 1124 and hinge portion 1122(1). Because rotation center 1160(1) is located above a flexible portion of attachment strip 1018 as viewed in the radial direction, end portion 1124 and hinge portion 1122(1) can rotate relative to one another about rotation centers 1160(1).

End portion 1124 is, preferably, attached to end portion 1002, e.g., by welding, gluing, or laser welding, or the like.

Two rotation sections 1130($n$) between adjacent hinge portions 1122($n$−1) and 1122($n$), preferably have the same design as rotation section 1130(1). Center of rotation 1160($n$) is aligned such that it is radially aligned with a flexible portion of attachment strip 1018 between plate 1014 and plate 1006. Pin 1156($n$) is attached to plate 1006, e.g., by gluing, welding, laser welding, or the like. Moreover, a portion of hinge portion 1122($n$−1) adjacent to rotation center 1160($n$) is attached to plate 1014, e.g., by gluing, welding, laser welding, or the like. This portion of hinge portion 1122($n$−1) may be a lip cut in hinge portion 1122($n$−1). In this way, pin 1156($n$) is attached to hinge portion 1122($n$−1) and yet properly held in place in slot 1158($n$). Attachment strip 1018 prevents longitudinal displacement between hinge portion 1122($n$−1) and hinge portion 1122($n$). Because rotation center 1160($n$) is located above a flexible portion of attachment strip 1018 as viewed in the radial direction, hinge portion 1122($n$−1) and hinge portion 1122($n$) can rotate relative to one another about rotation centers 1160($n$).

The pin 556($n$) has been described in the embodiments herein above as having a substantially flat disc shape, which can be attached to the attachment member, i.e., to the extension 506($n$), as well as to the extension 848($n$), by means of gluing, soldering, welding or laser welding. It is however understood that in alternative embodiments, the pin 556($n$) may comprise or be provided with a protrusion, and/or be formed by an elongated structure having an extension in the radial direction, whereby the pin 556($n$) can be attached to the attachment member, i.e. the extension 506($n$), by a mechanical connection such as a snap-fit or form-fit or similar, such as to rotationally fasten the pin to the attachment member. For example, the attachment member can be provided with an attachment member opening into which the protrusion or elongated structure of the pin can be inserted and fixated, e.g. by the protrusion or elongated structure having a diameter which is equal to or slightly larger than the attachment member opening. The pin may be fastened to the extension 848($n$) or plate 1006 in a similar manner.

Again, consecutive centers of rotation 1130($n$−1) and 1130($n$) are, preferably, located at positions rotated 90° relative to one another viewed in the tangential direction. If so, the total structure can be bent in any desired direction.

Note that when a user exerts a rotation force for the first time he will break the above mentioned fracture elements between edges 1126, 1128 at the rotation centers 1160(1) and between pins 1156(1) and the surrounding material of hinge portion 1122(1). Note also that pins 1156(1) are shown in FIG. 11 to have a shape of an arc of a circle, the same as slot 1158(1), however, with a smaller length. However, pins 1156(1) may have any other suitable shape, like a round shape. The same applies to all other fracture elements, and pins 1156($n$), respectively. Every pin 1156($n$) may be provided with a special attachment structure like a slotted structure 1144($n$) supporting attachment by laser welding or the like.

Mutual clearances between adjacent cylindrical elements is so small that they can easily move relative to one another in the longitudinal direction as long as they are not attached to one another but that mutual radial play is kept at a minimum. The mutual clearances may be in a range of 0.02 to 0.1 mm. The thickness of the cylindrical elements may be in a range of 0.1-2.0 mm, preferably 0.1-1.0 mm, more preferably 0.1-0.5 mm, and most preferably 0.2-0.4 mm. The diameters of the cylindrical elements may be in a range of 0.5-20 mm, preferably 0.5-10 mm, more preferably 0.5-6 mm.

Although the embodiments illustrated in FIGS. 5-11 are described with reference to a distal end part 13 of a steerable instrument, it can however be understood that the hinges described herein above can be applied also to other sections of the steerable instrument.

All cylindrical elements described herein above are, preferably, manufactured from a single cylindrical tube of any suitable material like stainless steel, cobalt-chromium, shape memory alloy such as Nitinol®, plastic, polymer, composites or other cuttable material. Alternatively, the cylindrical elements can be made by a 3D printing process. The thickness of that tube depends on its application. For medical applications the thickness may be in a range of 0.1-2.0 mm, preferably 0.1-1.0 mm, more preferably 0.1-0.5 mm, and most preferably 0.2-0.4 mm. The diameter of the inner cylindrical element depends on its application. For medical applications the diameter may be in a range of 0.5-20 mm, preferably 0.5-10 mm, more preferably 0.5-6 mm.

The slots and openings in all cylindrical elements can be made by laser or water cutting. The smaller slots which are made to just separate adjacent elements may have a width, preferably, in a range of 5-50 µm, more preferably 15-30 µm.

It will be clear to a person skilled in the art that the scope of the invention is not limited to the examples discussed in the foregoing, but that several amendments and modifications thereof are possible without deviating from the scope of the invention as defined in the attached claims. While the invention has been illustrated and described in detail in the figures and the description, such illustration and description are to be considered illustrative or exemplary only, and not restrictive. The present invention is not limited to the disclosed embodiments but comprises any combination of the disclosed embodiments that can come to an advantage.

The above embodiments are shown with bendable zones 14 and 15 at the proximal end of the instrument, arranged to control bending of the bendable zones 16, 17 at the distal end by means of two sets of longitudinal elements. The bendable zones 14, 15 can be replaced by other actuating means like suitable motors arranged to control the movement of the longitudinal elements. In a further alternative, such actuating means could be constructed as a ball to which the longitudinal elements are attached. Rotating the ball will longitudinally move the longitudinal elements and, thus, control the bending of the flexible zones 16, 17. This also applies to instruments with only one steerable, bendable zone at its distal end, as explained with reference to FIGS. 2g, 2h, 2i.

Variations to the disclosed embodiments can be understood and effected by a person skilled in the art in practicing the claimed invention, from a study of the figures, the description and the attached claims. In the description and claims, the word "comprising" does not exclude other elements, and the indefinite article "a" or "an" does not exclude a plurality. In fact it is to be construed as meaning "at least one". The mere fact that certain features are recited in mutually different dependent claims does not indicate that a combination of these features cannot be used to advantage. Any reference signs in the claims should not be construed as limiting the scope of the invention. Features of the above described embodiments and aspects can be combined unless their combining results in evident technical conflicts.

The invention claimed is:

1. A cylindrical element, having a central axis, with a hinge structure comprising:
    a first portion;
    a second portion which is made from a same cylindrical tube as the first portion and is located at a same distance from said central axis as said first portion and is rotatable relative to said first portion about two rotation sections arranged at locations 180 degrees rotated relative to one another;
    an attachment element located at a different distance from said central axis than said first portion and said second portion; and
    a pin made from the same cylindrical tube as the first portion and the second portion;
    wherein said rotation sections are implemented by:
        said first portion is provided with an opening entirely enclosed by the first portion and accommodating said pin;
        said pin is attached to a portion of said attachment element; and
        the second portion is attached to another portion of said attachment element;
        such that said first portion and said second portion cannot move relative to one another in a longitudinal direction, a tangential direction, or a radial direction but are configured to rotate relative to one another about a center of rotation.

2. The cylindrical element of claim 1, wherein the first portion comprises a first rotation section portion in which said opening is provided, and said second portion comprises a second rotation section portion which at least partially surrounds said first rotation section portion, and wherein said second rotation section portion is at least partly attached to said attachment element.

3. The cylindrical element of claim 2, wherein said first rotation section portion and said second rotation section portion comprise sections having complementing or rotatably interfitting shapes.

4. The cylindrical element of claim 2, wherein said first rotation section portion is formed as an extension provided with a slot defining an outer edge of said opening, and such that an island forming said pin is formed within said opening, and wherein said second rotation section portion is formed by a notch.

5. The cylindrical element of claim 1, wherein said opening is a circular shaped opening having a center forming said center of rotation and said pin is arranged in said opening such as to be rotatable about said center of rotation.

6. The cylindrical element of claim 1, wherein said opening is a slot arranged along an arc of a circle having a center forming said center of rotation, said pin being arranged in said slot such as to be movable in said slot along said arc of said circle.

7. A steerable instrument comprising a cylindrical element according to claim 1.

8. The steerable instrument according to claim 7, comprising a further cylindrical tube located inside said cylindrical tube, wherein the attachment element is a hinge portion of a further hinge structure in the further cylindrical tube.

9. The steerable instrument according to claim 7, comprising a further cylindrical tube located inside said cylindrical element, wherein the attachment element is a tangential spacer between adjacent steering strips in the further cylindrical tube.

10. The steerable instrument according to claim 9, comprising a steerable distal end portion by means of said steering strips, said steering strips being longitudinal elements cut from said further cylindrical tube.

11. The steerable instrument according to claim 10, wherein said tangential spacer is a portion cut from said further cylindrical tube.

12. The steerable instrument of claim 7, comprising a further cylindrical tube located inside said cylindrical tube, wherein the attachment element is a tangential spacer between adjacent steering cables in the further cylindrical tube.

13. The steerable instrument according to claim 12, comprising a steerable distal end portion by means of said steering cables.

14. The steerable instrument according to claim 13, wherein said tangential spacer is a portion cut from said further cylindrical tube.

15. A method of manufacturing a cylindrical element, having a central axis, with a hinge structure, the method comprising:
    forming a first portion and a second portion from a single cylindrical tube by cutting a predetermined pattern from said cylindrical tube, such that the second portion is located at a same distance from said central axis as said first portion and is rotatable relative to said first portion about two rotation sections arranged at locations 180 degrees rotated relative to one another;
    providing an attachment element at a different distance from said central axis than said first portion and said second portion; and
    implementing said rotation sections by:

providing said first portion with an opening entirely enclosed by the first portion such that the opening accommodates a pin made from the single cylindrical tube;
attaching said pin to a portion of said attachment element; and
attaching the second portion to another portion of said attachment element;
such that said first portion and said second portion cannot move relative to one another in a longitudinal direction, a tangential direction, or a radial direction but are configured to rotate relative to one another about a center of rotation.

16. The method according to claim 15, including inserting a further cylindrical tube inside said single cylindrical tube, which further cylindrical tube comprises said attachment element, and then attaching said pin to said portion of said attachment element, and attaching said second portion to said other portion of said attachment element.

17. The method according to claim 16, including breaking one or more fracture elements which are still attaching said pin to surrounding material of said single cylindrical tube during said inserting said further cylindrical tube inside said single cylindrical tube, and said breaking being performed after said attaching said pin to said portion of said attachment element, and attaching said second portion to said other portion of said attachment element.

* * * * *